United States Patent
Wei et al.

(10) Patent No.: US 9,445,446 B2
(45) Date of Patent: Sep. 13, 2016

(54) METHOD AND APPARATUS FOR DEVICE TO DEVICE COMMUNICATION

(71) Applicant: Industrial Technology Research Institute, Hsinchu (TW)

(72) Inventors: Hung-Yu Wei, Taipei (TW); Ching-Chun Chou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 423 days.

(21) Appl. No.: 13/831,915

(22) Filed: Mar. 15, 2013

(65) Prior Publication Data

US 2014/0010172 A1    Jan. 9, 2014

Related U.S. Application Data

(60) Provisional application No. 61/669,647, filed on Jul. 9, 2012.

(51) Int. Cl.
*H04W 76/02* (2009.01)
*H04W 8/00* (2009.01)

(52) U.S. Cl.
CPC ........... *H04W 76/023* (2013.01); *H04W 8/005* (2013.01)

(58) Field of Classification Search
CPC .......................... H04W 76/02; H04W 76/023
See application file for complete search history.

(56) References Cited

U.S. PATENT DOCUMENTS

| | | |
|---|---|---|
| 6,904,055 B2 | 6/2005 | Pichna et al. |
| 8,213,360 B2 | 7/2012 | Koskela et al. |
| 2006/0168343 A1 | 7/2006 | Ma et al. |
| 2009/0019150 A1 | 1/2009 | Li et al. |
| 2009/0287827 A1 | 11/2009 | Horn et al. |
| 2010/0009675 A1 | 1/2010 | Wijting et al. |
| 2011/0098043 A1 | 4/2011 | Yu et al. |
| 2011/0106837 A1 | 5/2011 | Walton et al. |

(Continued)

FOREIGN PATENT DOCUMENTS

| | | |
|---|---|---|
| CN | 102090132 | 6/2011 |
| TW | 201127171 | 8/2011 |

(Continued)

OTHER PUBLICATIONS

"Office Action of Europe Counterpart Application", issued on Oct. 21, 2013, p. 1-p. 8.

(Continued)

*Primary Examiner* — Redentor Pasia
(74) *Attorney, Agent, or Firm* — Jianq Chyun IP Office

(57) ABSTRACT

This disclosure proposes a method to achieve D2D (device to device) communication in LTE system. Traditional communication in LTE systems is based on eNB. UEs (User Equipment) need to connect to eNB to send uplink and downlink transmission. Device to device communication is different from the traditional LTE scheme. UEs may directly connect to other UEs, sending data to each other. The disclosure provides the signaling process, based on LTE network entry procedure, to establish D2D communication in LTE system. D2D UEs send Msg1 to another D2D UE, and the recipient respond with Msg2. After the negotiation between D2D UEs, Msg3 and Msg4 are exchanged between UEs and eNB. Several embodiments are provided for the signaling of Msg3 and Msg4. The D2D data transmission may be enabled after the Msg4 or explicit data session initialization.

35 Claims, 24 Drawing Sheets

(56) References Cited

U.S. PATENT DOCUMENTS

| | | | |
|---|---|---|---|
| 2011/0258313 A1 | 10/2011 | Mallik et al. | |
| 2011/0258327 A1 | 10/2011 | Phan et al. | |
| 2011/0312331 A1 | 12/2011 | Hakola et al. | |
| 2011/0317569 A1 | 12/2011 | Kneckt et al. | |
| 2012/0011247 A1 | 1/2012 | Mallik et al. | |
| 2012/0015607 A1* | 1/2012 | Koskela | H04W 76/023 455/62 |
| 2012/0115518 A1 | 5/2012 | Zeira et al. | |
| 2012/0163235 A1* | 6/2012 | Ho | H04W 76/023 370/254 |
| 2012/0184306 A1 | 7/2012 | Zou et al. | |
| 2013/0155962 A1* | 6/2013 | Hakola | H04W 72/042 370/329 |
| 2013/0157679 A1* | 6/2013 | Van Phan | H04W 76/023 455/452.2 |
| 2013/0287012 A1* | 10/2013 | Pragada | H04W 76/045 370/338 |
| 2014/0038590 A1* | 2/2014 | Wijting | H04W 76/023 455/426.1 |
| 2014/0120907 A1* | 5/2014 | Yu | H04W 76/023 455/426.1 |
| 2015/0111587 A1* | 4/2015 | Kalhan | H04W 72/04 455/450 |

FOREIGN PATENT DOCUMENTS

| | | |
|---|---|---|
| WO | 2011047956 | 4/2011 |
| WO | 2012015698 | 2/2012 |
| WO | 2012088470 | 6/2012 |

OTHER PUBLICATIONS

Wu et al., "FlashLinQ: A Synchronous Distributed Scheduler for Peer-to-Peer Ad Hoc Networks," 48th Annual Allerton Conference on Communication, Control, and Computing (Allerton), Sep. 29, 2010-Oct. 1, 2010, pp. 514-521.

Corson et al., "Toward Proximity-Aware Internetworking," IEEE Wireless Communications 17(6), Dec. 2010, pp. 26-33.

Yu et al., "Resource Sharing Optimization for Device-to-Device Communication Underlaying Cellular Networks," IEEE Transactions on Wireless Communications 10(8), Aug. 2011, pp. 2752-2763.

Vigato et al., "Joint Discovery in Synchronous Wireless Networks," IEEE Transactions on Communications 59(8), Aug. 2011, pp. 2296-2305.

Doppler et al., "Device-to-Device Communication as an Underlay to LTE-Advanced Networks," IEEE Communications Magazine 47(12), Dec. 2009, pp. 42-49.

Yoon et al., "Collaborative Streaming-based Media Content Sharing in WiFi-enabled Home Networks," IEEE Transactions on Consumer Electronics 56(4), Nov. 2010, pp. 2193-2200.

Trifunovic et al., "WiFi-Opp: Ad-Hoc-less Opportunistic Networking," CHANTS'11 Proceedings of the 6th ACM workshop on Challenged networks, Sep. 23, 2011, pp. 37-42.

Wi-Fi Certified Wi-Fi Direct™, Wi-Fi Alliance®, Oct. 2010, pp. 1-14.

"Study on Proximity-based Services," 3GPP Service and System Aspects Working Group 1, Rel-12 Working Item, SP-110638, 3GPP TSG SA Plenary Meeting #53, Sep. 19-21, 2011, pp. 1-5.

Fodor et al., "Design Aspects of Network Assisted Device-to-Device Communications," IEEE Communications Magazine 50(3), Mar. 2012, pp. 170-177.

"Part 15.1: Wireless medium access control (MAC) and physical layer (PHY) specifications for wireless personal area networks (WPANs)," 802.15.1™ IEEE Standard for Information technology—Telecommunications and information exchange between systems—Local and metropolitan area networks—Specific requirements, Jun. 14, 2005, IEEE Computer Society, pp. 1-600.

Specification of the Bluetooth System, Bluetooth SIG, Ver. 4.0, Jun. 30, 2010, pp. 1-2302.

"Office Action of China Counterpart Application", issued on Feb. 2, 2016, p. 1-p. 12.

* cited by examiner

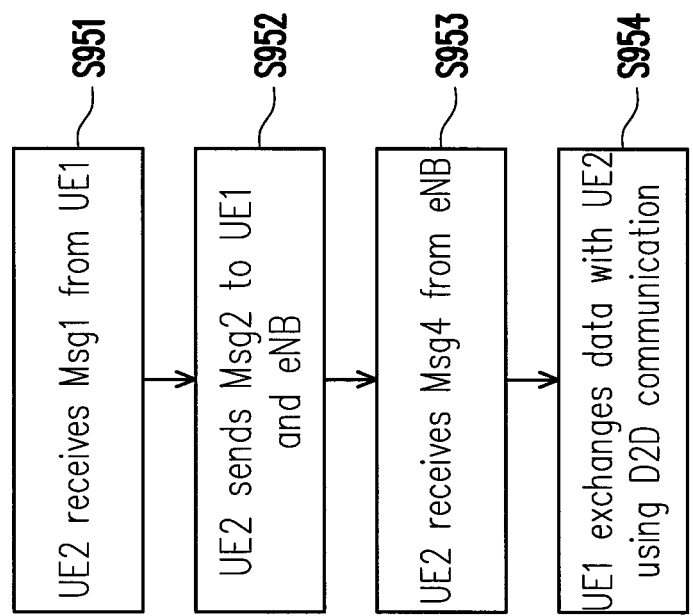

METHOD AND APPARATUS FOR DEVICE TO DEVICE COMMUNICATION

CROSS REFERENCE TO RELATED APPLICATION

This application claims the priority benefit of U.S. provisional application Ser. No. 61/669,647, filed on Jul. 9, 2012. The entirety of the above-mentioned patent application is hereby incorporated by reference herein and made a part of this specification.

BACKGROUND

Technical Field

The present disclosure generally relates to a method for device to device (D2D) communications and apparatuses using the same.

RELATED ART

Device to Device (D2D) communication is a technology which enables UEs (User Equipment) to communicate with each other without an eNB's (enhanced NodeB or eNodeB) forwarding data in between. A traditional LTE communication system generally requires a UE to first establish a connection with an eNB before it may access the communication system. The operating principle of a traditional LTE communication system could be described using an example as follows. Supposedly that there are two UEs, UE1 and UE2, and both of which are within the coverage of an eNB and would like to setup a connection with each other. Consequently the data exchanges would either follow the path of UE1→eNB→UE2 or the path of UE2→eNB→UE1. That is, the eNB needs to forward data for both the UE1 and the UE2. Had the UE1 and the UE2 been close to each other, a D2D communication between the UE1 and the UE2 would actually reduce the radio resource consumption as the data forwarding of an in between eNB would be superfluous. The application of D2D in this scenario would be categorized as a proximity based service (PBS) as only users in the proximity of each other may apply this service.

FIG. 1A illustrates the network entry (or re-entry) procedure of a conventional LTE communication system. As shown in FIG. 1A, a wireless device or UE 101 would connect to a control node such as a base station or eNB through several signaling message exchange generally known Msg1 111, Msg2 112, Msg3 113, and Msg4 114 for those who are skilled in the art. In order to establish a connection between the UE 101 and the eNB 102, a network entry procedure would be required.

FIG. 1B illustrates the current network entry (or re-entry) procedure of a conventional LTE communication system. In the first step, UE 101 sends a random access channel (RACH) preamble 121, which is also known as Msg1 111, to eNB 102 to indicate that UE 101 would intend to connect to eNB 102. In general, one purpose of a RACH preamble is for a UE to initiate a random access to a communication system through an eNB. It should be noted that in RACH preamble 121, there may not be a UE identity info. The implication is that if two or more UEs were to send an identical RACH preamble to an eNB simultaneously, the eNB would not be able to distinguish the identities among these UEs.

Next, in the second step, the eNB 102 would send Msg2 112 which may include a time alignment (TA) information and a scheduling grant 122 back to the UE 101. Upon receiving the RACH preamble 121, the eNB 102 would respond with a scheduling grant which would allow a UL transmission in the third step. The purpose of a TA information may include the synchronization between a UE and an eNB through the exchanges of Msg1 and Msg2, and the purpose of a scheduling grant may include scheduling a uplink resource for Msg3 to the UE.

In the third step, the UE 101 sends Msg3 113 which would include a RRC Connection Request 123 in which the identity information of the UE 101 would be sent to the eNB 102. Upon receiving RRC Connection Request 123, the eNB 102 would know which UE intends to establish a RRC connection. The purpose of a RRC Connection Request may include waiting for the authorization of an eNB before connecting to a communication system.

In the fourth step, after receiving RRC Connection Request 123, eNB 102 would respond with Msg4 114 including a RRC Connection Setup 124. Consequently, a RRC connection between the UE 101 and the eNB 102 may then be successfully established. The purpose of a RRC Connection Setup may include indicating to a UE that an access request has been granted.

Based on the aforementioned descriptions for FIGS. 1A and 1B, it would be evident that a traditional LTE system would only allow signaling to be exchanged between UEs and eNBs while direct exchanges among UEs themselves are not yet defined. Therefore, D2D communications at this point in time would not yet feasible in a LTE communication system since the existing LTE's signaling procedures cannot accommodate D2D communications as the most recently published LTE standard, the release 10 (Rel-10), does not include a D2D capability. Currently, even though UEs in a LTE system could be situated right next to each other, the UEs would still be required to go through the network entry procedure through an eNB which would forward each and every data sent by one UE to another UE. Therefore, a new signaling scheme for a direct communication among UEs while minimizing the need of an eNB to forward data in between would still be needed.

In addition to the unavailability of standards or specifications, D2D communication in LTE systems would also encounter difficulties related to the proximity detection. Before engaging in D2D communications, D2D UEs would need to know the relative proximity of other UEs. This can be accomplished either by detections initiated by the D2D UEs, or the network should inform each UE of other UEs in the proximity. The network-based solution would then be unreliable as mobile UEs could travel around different cells. A backhaul network would only know either a UE residing in one cell or in the coverage of a set of cells. Because of the unreliability of UEs' location information, a network could only provide a list of "potential D2D UEs" for D2D callers, rather than a list of UEs ready to receive D2D connections.

Even if certain positioning device, such as GPS, is relied upon, wireless channel statuses among the UEs may still be unknown. For instance, two UEs may be physically close to each other, but the actual channel status between the two UEs could be poor because of shielding of nearby obstacles. In this case, two UEs communicating using the D2D connection would not only unfeasible but could be a waste of radio resources. In this case, data exchanges would be done by traditional LTE systems using an eNB to forward data in between UEs. In any case, network-based solution for UE proximity detection is not only unreliable but is inefficient in view of radio resources. Therefore, a method and a new system for proximity detection could also be required in order to implement D2D communications in the current LTE system.

SUMMARY OF THE DISCLOSURE

Accordingly, The present disclosure is directed to a method of performing device to device (D2D) communication, a base station using the same, and a user equipment (UE) using the same.

The present disclosure directs to a D2D communication method, adapted for a caller UE, and the method includes the steps of transmitting to a first target a first message comprising a request for a direct communication with the first target, receiving from the first target a second message comprising an acceptance for the direct communication with the first target, transmitting to a second target a third message comprising the request for the direct communication with the first target, and establishing the direct communication with the first target when the request is accepted by the second target.

A D2D communication method, adapted for a callee UE, and the method includes the steps of receiving from a first target a first message comprising a request for a direct communication with the first target, determining whether to accept the request for the direct communication with the first target, transmitting to the first target a second message comprising an acceptance for the direct communication with the first target when the request is accepted, transmitting to the first target a second message comprising a rejection for the direct communication with the first target when the request is denied, and establishing the direct communication with the first target when the direction communication is granted by a second target.

A D2D communication method, adapted for a control node, and the method includes the steps of receiving a first message from a target comprising a request for a direct communication with a second target, determining whether to grant the request for the direct communication with the second target, transmitting to either the first target or the second target a second message comprising a grant for the request for the direct communication with the second target when the eNB determines to grant the request, and transmitting to either the first target or the second target a second message comprising a rejection for the request for the direct communication with the second target when the eNB determines to deny the request.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9B illustrates callee's view of message exchange with resource allocation and indication.

DETAILED DESCRIPTION OF DISCLOSED EMBODIMENTS

Figure 1A:
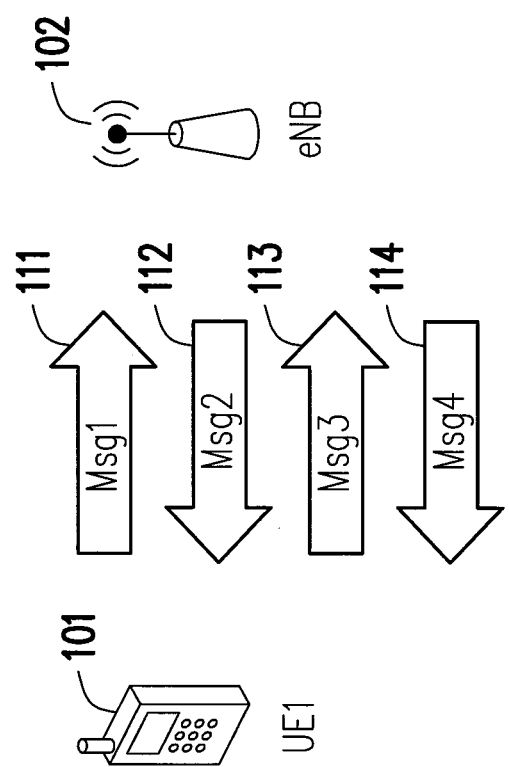
FIG. 1A illustrates the network entry procedure of a conventional LTE communication system.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

A control node in this disclosure would be referred to as a base station (BS) or an eNB. It should be noted that the references of such are merely exemplary and therefore do not serve as limitations to the type of control nodes as it would be apparent to those skilled in the art that other types of control node could be selected to achieve network control purposes such as an advanced base station (ABS), a base transceiver system (BTS), an access point, a home base station, a relay station, a scatterer, a repeater, an intermediate node, an intermediary, and/or satellite-based communication base stations.

The control node may also be referred to entities such as a Mobility Management Entity (MME), a Serving Gateway (S-GW), a Packet Data Network Gateway (PDN-GW), a Serving GPRS Support Node (SGSN), a Gateway GPRS Support Node (GGSN), a Mobile Switching Center (MSC), and a Home Subscriber Server (HSS) or a node maintaining a database related to subscriber information.

From the hardware perspective, a control node may also be referred to as an apparatus including at least but not limited to a transmitter circuit, a receiver circuit, an analog-to-digital (A/D) converter, a digital-to-analog (D/A) converter, a processing circuit, one or more antenna units, and optionally a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifiering, and so forth. The analog-to-digital (A/D) or the digital-to-analog (D/A) converter is configured to convert from an analog signal format to a digital signal format during uplink signal processing and from a digital signal format to an analog signal format during downlink signal processing.

The processing circuit is configured to process digital signal and to perform procedures related to the proposed method in accordance with exemplary embodiments of the present disclosure. Also, the processing circuit may optionally be coupled to a memory circuit to store programming codes, device configurations, a codebook, buffered or permanent data, and etc. The functions of the processing circuit may be implemented using programmable units such as a micro-processor, a micro-controller, a DSP chips, FPGA, etc. The functions of the processing circuit may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

From the hardware perspective, a UE may also be referred to as an apparatus which includes at least but not limited to a transmitter circuit, a receiver circuit, an analog-to-digital (A/D) converter, a digital-to-analog (D/A) converter, a processing circuit, one ore more antenna units, and optionally a memory circuit. The memory circuit may store programming codes, device configurations, buffered or permanent data, codebooks, and etc. The processing circuit may also be implemented with either hardware or software. The function of each element of a UE is similar to a control node and therefore detailed descriptions for each element will not be repeated.

Conventionally, a LTE communication system uses random access channel (RACH) for network entry as RACH allows UEs to request and to establish connections with eNBs. In order to implement D2D network entry in a LTE communication system, the existing RACH procedure of the LTE communication system needs to be revised. However, the RACH in a conventional LTE system cannot handle the direct connection establishment between UEs, because the traditional RACH is designed for UEs to enter a communication system through an eNB.

Therefore, a transmission method to enable the direct D2D communication between two UEs in proximity with minimal interaction with an eNB is proposed. While traditional RACH in LTE systems cannot handle the network entry procedures and connection setup in D2D scenarios, several new RACH procedures to enable the D2D communications are proposed. The proposed transmission method would enable the UEs to find each other by broadcasting RACH messages, replying with their agreements to setup connections, and by implementing request/grant procedures between D2D UEs and an eNB.

Another difficulty as previously mentioned is that while channel statuses between an eNB and each UE could be detected, channel statuses among UEs themselves could be unknown if UEs are to communicate directly among themselves. In order to overcome this challenge, the channel status between UEs should be measured by the UEs themselves. Therefore, in order to implement the D2D communication in LTE communication systems, UE could be configured to detect each other UEs which are near each other directly. Spectrum leasing and charging schemes could be implemented by having UEs desiring to establish D2D connections to inform a network of their intentions to operate in the D2D mode and also to request for permissions and resources for further D2D data transmission.

Therefore a new RACH procedure for D2D communications between D2D UEs and eNB is proposed. The new procedure enables the D2D UEs to find each other by broadcasting messages. When a UE receives a message, the UE may reply with an agreement message to declare the intention that the UE is willing to establish a D2D connection with other UEs. The UEs then as a sender or a receiver or both would notify an eNB of the D2D communication. The eNB would then either grant or rejected the D2D communication request. The proposed signalling procedure will enable both the negotiation between two D2D UEs and between D2D UEs to an eNB. The UEs intending to communicate in D2D mode could then be found, and connections could be established. An UE initializing a D2D connection would be able to establish a D2D connection with a targeted UE.

Figure 1B:
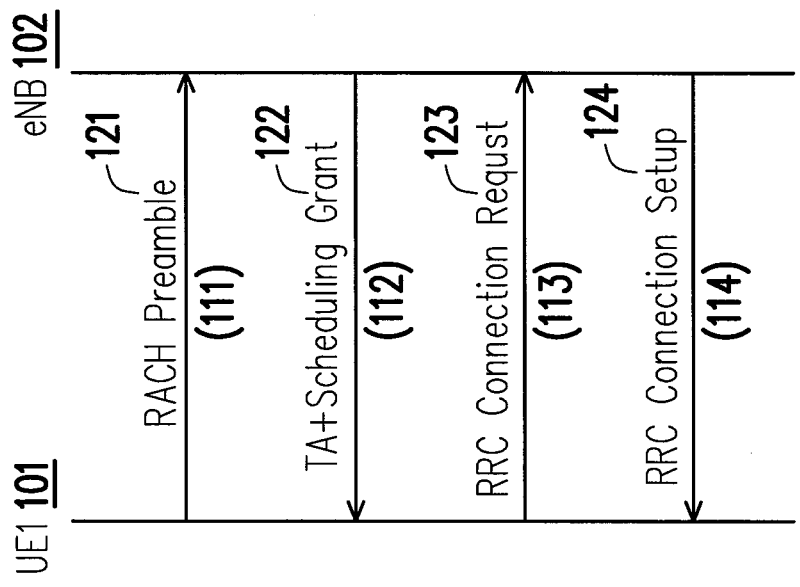
FIG. 1B illustrates the network entry procedure of a conventional LTE communication system.

One of the main goals of the present disclosure is to enable D2D communications by utilizing an existing communication system such as the LTE communication system or a system with similar infrastructures without requiring a complete overhaul of an existing system. Therefore, the present disclosure proposes a modified network entry procedure based on an existing procedure as described in FIGS. 1A and 1B. While Msg1, Msg2, Msg3, and Msg4 per se may be similar to the conventional procedure, in accordance with the present disclosure, Msg1 and Msg2 are exchanged among UEs in proximity and is used to measure the latest channel status to ensure the feasibility of the D2D mode of communication. Msg3 and Msg4 are exchanged between a control node such as an eNB and a UE to request for D2D radio resources. The control node may accept or reject the D2D requests sent by UEs. In order to fully utilize the principle behind the present disclosure, four different embodiments labeled mechanism through A to D are to be presented. Mechanism D is the structure with the most detailed signaling messages, while Mechanism A~C can be viewed as an optimization for reduced signaling messages adapted for different scenarios.

Figure 2A:
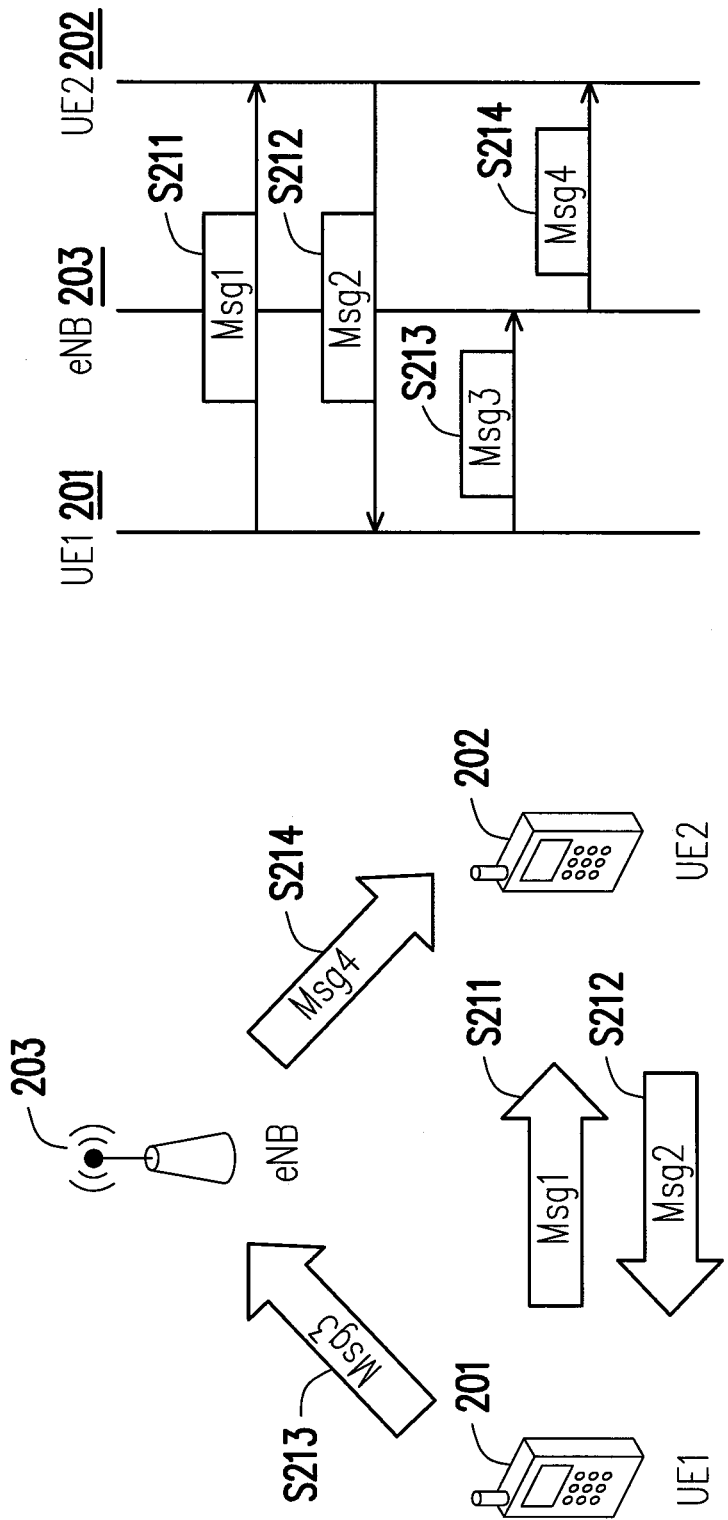
FIG. 2A illustrates D2D mechanism A in accordance with one of the exemplary embodiments of the present disclosure.

FIG. 2A illustrates D2D mechanism A of the proposed D2D RACH procedure in accordance with one of the exemplary embodiments of the present disclosure. In FIG. 2A, UE1 201 could directly communicate with UE2 202 under the supervision or coordination of eNB 203. In step S211, UE1 201 initiates the D2D signaling procedure by sending Msg1 to UE2 202. Msg1 may include a random access preamble which initiates a network entry procedure. However, what is different from the conventional communication system is that UE1 201 tries to find other D2D UEs directly through Msg1 as opposed to UE1 requesting a random access to an eNB in the conventional communication system. By transmitting Msg1 in step S211, UE1 201 may indicate an intention to establish a network connection service between UE1 201 and UE2 202. If UE2 202 could not be found or is unavailable or is unwilling to participate in D2D mode of communication after transmitting Msg1 once or several times, then UE1 201 may fall back to the conventional RACH procedure and establish the communication with UE2 202 through conventional means.

It should be noted that Msg1 could be a predefined a predefined preamble or a predefined code (e.g. CDMA code) or a pseudo-random sequence.

Msg 1 could also be selected from a set of preambles or from a set of codes (e.g. CDMA codes) or from a set of pseudo-random sequences. In other words, Msg1 could be a dynamically selected signaling sequence or a dynamically selected code from a set of signaling sequences or from a set of codes.

The selection of the preamble/code/sequence might be random. The selection of the preamble/code/sequence might indicate types of service, types of devices (initiator type), or types of devices (acceptor type).

Also it should be noted that Msg1 might not include a device identification of the UE1 201.

In Step S212 of FIG. 2A, when the callee, UE2 202, accepts the connection establishment upon the reception of Msg1, UE2 202 may reply with a random access response or Msg2 back to the caller, UE1 201. What is different from the conventional RACH procedure is that by transmitting Msg2 in step S212, UE2 202 may indicate in Msg2 to accept or decline the invitation. Furthermore, Msg2 would include timing alignment (TA) information. However, the TA information is for accomplishing timing synchronization between UE1 201 and UE2 202 through the exchanges of Msg1 and Msg2 rather than accomplishing timing synchronization between UE1 201 and eNB 203 for the conventional RACH procedure.

In Step 213, when the D2D caller, UE1 201, receives Msg2, UE1 may send a signaling message, Msg3, to a network infrastructure node or control node. The control node could be a base station or an eNB, and it should be noted that these instances are merely exemplary and should not constitute limitation, and the control node could also in fact be a Serving Gateway (S-GW), a Gateway General Packet Radio Services (GPRS) Support Node (GGSN), a Serving GPRS Support Node (SGSN), a Radio Network Controller (RNC), an Access Service Network Gateway (ASN-GW), and etc. By transmitting Msg3, to eNB 203, UE1 201 notifies the possibility of a connection establishment between UE1 201 and UE2 202 and requests for the D2D communication to be scheduled.

In general, Msg3 is transmitted to serve the purpose of notifying an eNB of the D2D connection between two UEs and to request radio resources. Msg3 may include information such as user device identification, authorization information (e.g. authorization code, policy), D2D connection configuration or policy, type of D2D service request, reception quality of Msg1 and/or Msg2 (which could be retrieved by measuring the received signal), expiration time, and the RNTI or UE1, UE2, or both.

In Step 214, when eNB 203 receives Msg3, eNB 203 resolves the network contention by sending a signaling message, Msg4, to UE2 202. Before transmitting Msg4, eNB 203 may look up its network management or configuration policy or pricing issue to check whether the network should authorize the connection establishment between UE1 and UE2, and subsequently Msg4 may indicate whether the request for D2D communication has succeeded or has failed. eNB 203 may also make authorization decision based on the radio resources allocation or notification of network or other control nodes.

Figure 2B:
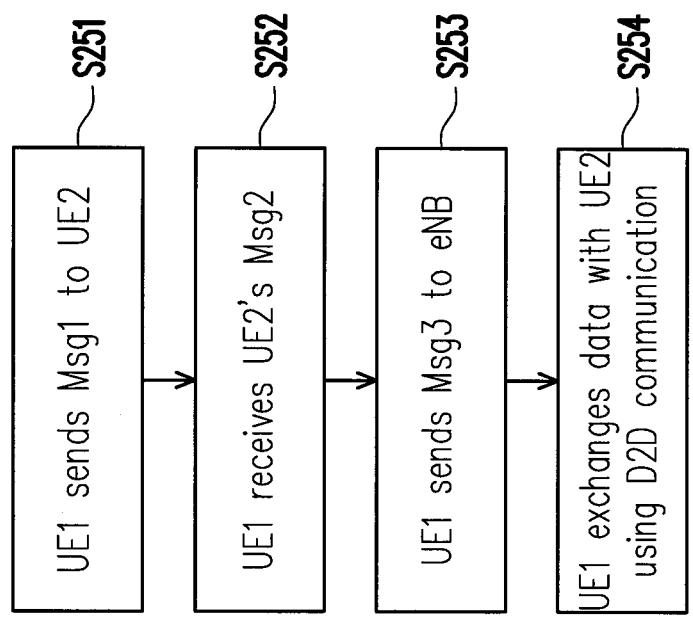
FIG. 2B illustrates a flow chart of mechanism A from a caller's point of view.

FIG. 2B illustrates a flow chart of mechanism A from a caller's point of view. In step S251, UE1 201 intends to establish D2D connection with UE2 202 by sending Msg1 to UE2 202, and Msg1 could be received by UE2 202. In step S252, after Msg1 is received by UE2 202, UE202 may agree or not agree to establish the D2D connection with UE1 through the reply of Msg2 to UE1 201. In step S253, UE1 201 requests for permission and transmission resources from eNB 203 through Msg3 to eNB 203. In step S253, after eNB 203 agrees the D2D connection between UE1 201 and UE2 202, UE1 201 would be able to communicate with UE2 202 in D2D mode.

Figure 2C:
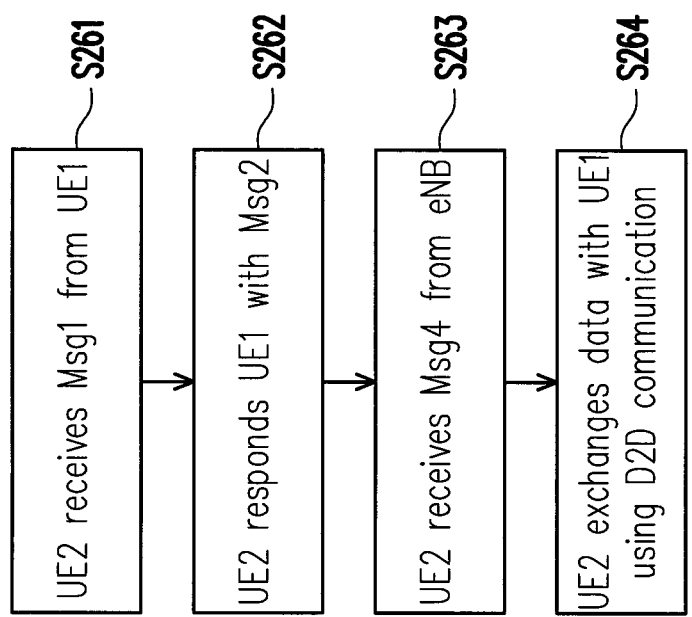
FIG. 2C illustrates a flow chart of mechanism A from a callee's point of view.

FIG. 2C illustrates a flow chart of mechanism A from a callee's point of view. In step S261 UE2 202 which is assumed to have D2D capability receives Msg1 from UE1. In step S262, UE2 202 may either agree or reject the D2D request from UE1 201 in the response of Msg2. Assuming that UE2 agrees and the request for D2D has been granted by eNB 203, in step S263 UE2 202 then receives from eNB 203 Msg4 indicating an access grant. In step 264, UE2 exchanges data with UE1 using D2D communication.

Figure 3A:
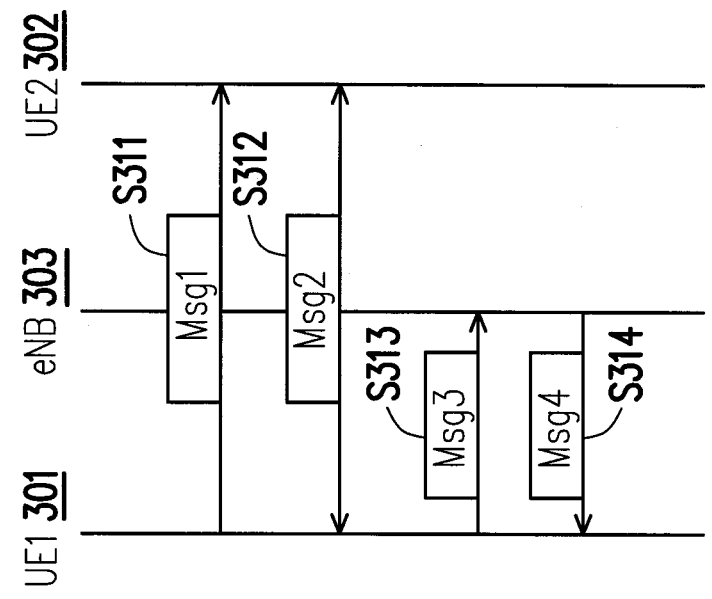
FIG. 3A illustrates D2D mechanism B in accordance with one of the exemplary embodiments of the present disclosure.
Figure 3A:
Figure 3A:
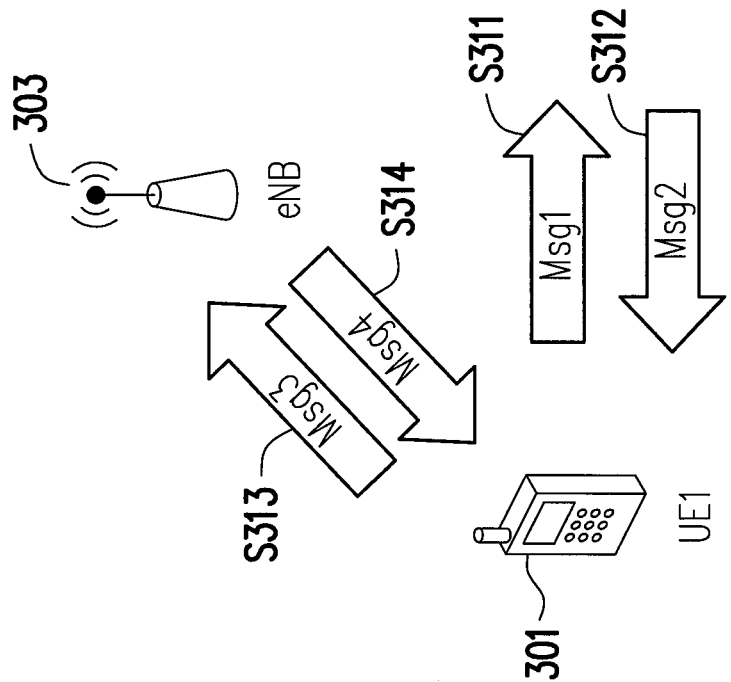

FIG. 3A illustrates D2D mechanism B in accordance with one of the exemplary embodiments of the present disclosure. Mechanism B is similar to Mechanism A except for step S314. In step S311, UE1 301 sends Msg1 to UE2 302. In step S312, UE2 302 sends Msg2 to UE1 301. In step S313, UE1 sends Msg3 to eNB 303. Please note that steps S311, S312, and S313 are the same as steps S211, S212, and S213 respectively as Mechanism A, and therefore, the descriptions will not be repeated. However, in step S314, eNB 303 sends Msg3 to UE1 301 indicating access grant and radio resources for D2D communication rather than UE2 302.

Figure 3B:
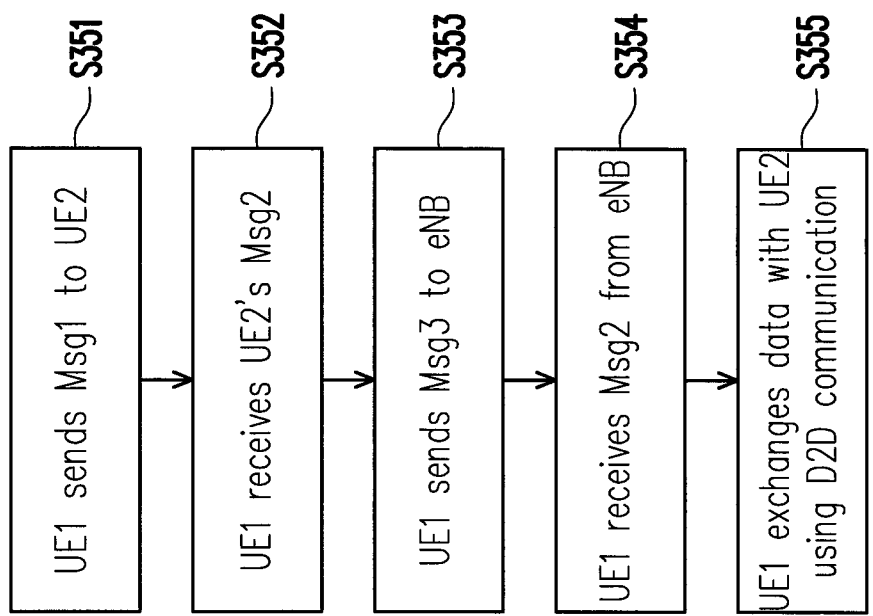
FIG. 3B illustrates a flow chart of mechanism B from a caller's point of view.

FIG. 3B illustrates a flow chart of mechanism B from a caller's point of view. In step S351, UE1 301 intends to establish D2D communication with another UE by indicating the intention in Msg1, and UE2 302 receives Msg1. In step S352, UE1 301 receives from UE2 302 a response as in Msg2 which may indicate whether to accept the request from UE1 301. In step S353, UE1 301 requests for D2D radio resources through Msg3 to eNB 303. In step S354, eNB 303 either grants or rejects the request from UE1 301 through Msg4 to UE1 301. In step S355, if eNB 303 permits the D2D communication between UE1 301 and UE2 302, data session will be initialized as UE1 301 would exchange data with UE2 302 using D2D communication.

Figure 3C:
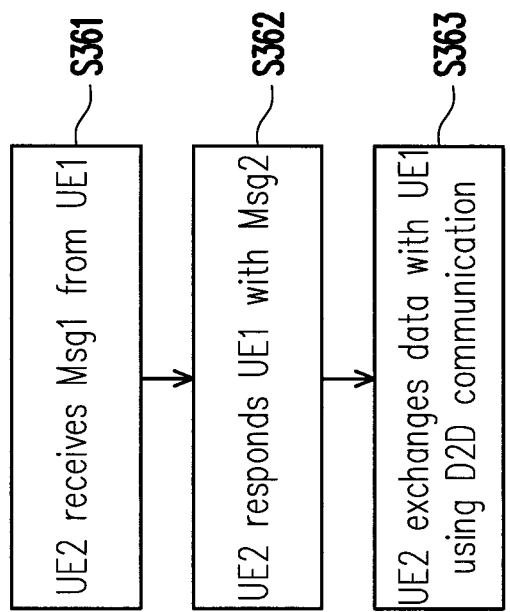
FIG. 3C illustrates a flow chart of mechanism B from a callee's point of view.

FIG. 3C illustrates a flow chart of mechanism B from a callee's point of view. In step S361, assuming that UE2 302 with D2D capability and UE2 302 receives from UE1 301 Msg1 including a request for D2D communication. In step S362, UE2 302 responds to UE1 301 with Msg2 which may indicate whether to accept or reject the request. If eNB 303 permits the D2D communication between UE1 301 and UE2 302, then step S363 would proceed. In step S363, UE2 302 exchanges data with UE1 301 using D2D communication.

Figure 4A:
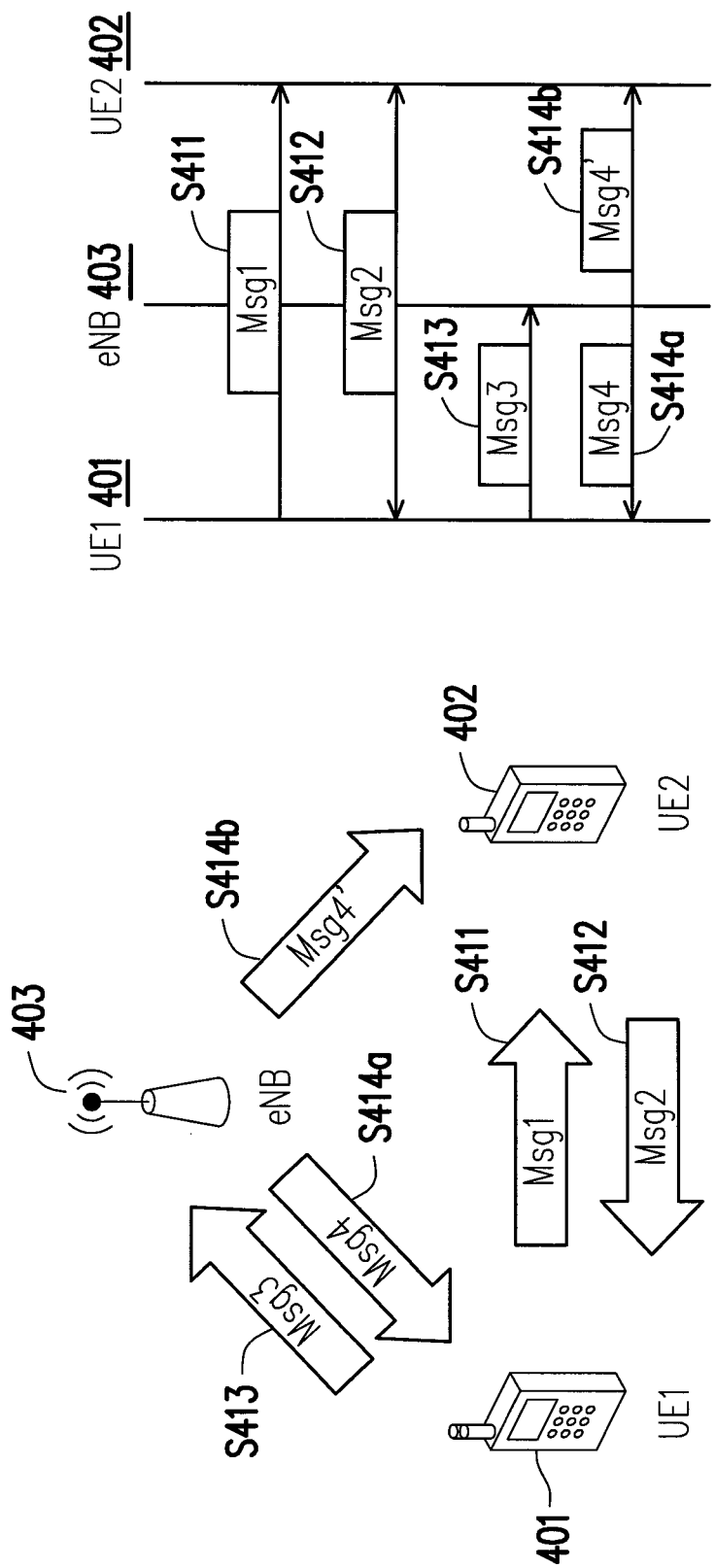
FIG. 4A illustrates D2D mechanism C in accordance with one of the exemplary embodiments of the present disclosure.

FIG. 4A illustrates D2D mechanism C in accordance with one of the exemplary embodiments of the present disclosure. In step S411, UE1 401 sends Msg1 to the UE2 as UE1 401 intends to initiate a D2D communication. In step S412, UE2 402 respond to the request with Msg2. In step S413, UE1 401 requests for radio resource from eNB 403 by sending Msg3 to eNB 403. In step S414a, eNB 403 responds to UE1 401 with Msg4 and in step S414b, eNB 403 responds to UE2 402 with Msg4'.

It should be noted that Mechanism C is similar to Mechanism A except that Msg4 is sent to both UE1 401 and UE2 402 (as in Msg4') so that both UE1 401 and UE2 402 are informed of the decision of eNB 403 and receives the content of Msg4. The content of Msg4 and Msg4' may be the same. The timing of Msg4 may also be synchronous or asynchronous, and the transmission timing of Msg4 and Msg4 may be the same, or either one of Msg4 or Msg4' may be sent earlier or later than the other. The transmission of Msg4 and Msg4' may be through different channels or may be through the use the same multicast or broadcast channel.

Either one of Msg4 and Msg4' or both may also include additional information including user device identification, authorization information such as authorization code or authorization policy, and D2D connection configuration or D2D connection policy.

Figure 4B:
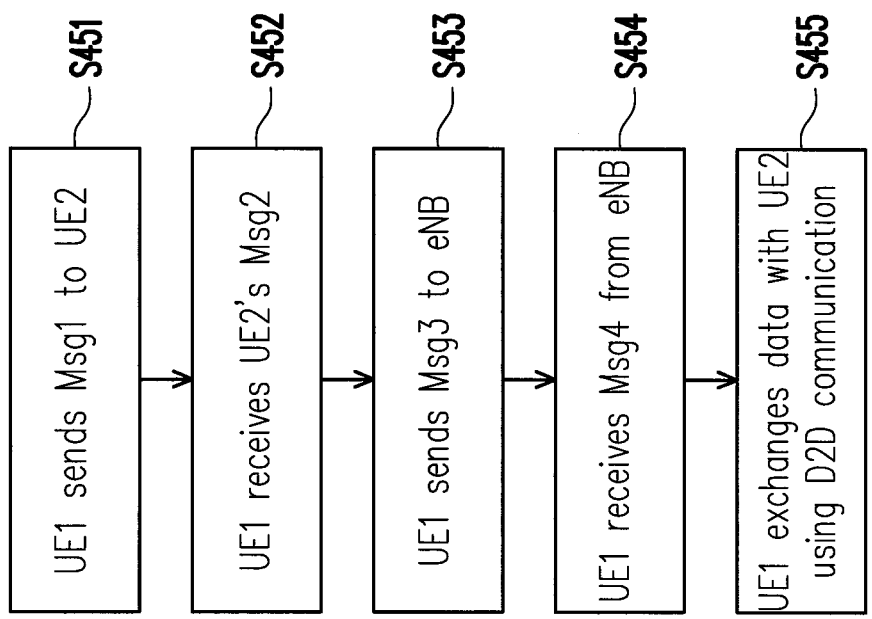
FIG. 4B illustrates a flow chart of mechanism C from a caller's point of view.

FIG. 4B illustrates a flow chart of mechanism C from a caller's point of view. In step S451, UE1 401 sends Msg1 to UE2 402 to establish the D2D connection with UE2 402. After UE 401 sends Mgs1, Msg1 is assumed to be received by UE2 402. In step S452, assuming that UE2 402 agrees with establish the D2D connection with UE1 401, UE2 402 then sends Msg2 to UE1 401. If assuming that UE1 401 receives Msg2 from UE2 402 in step S452, then in step S453, UE1 401 requests from eNB 403 for D2D radio resources by sending Msg3 to eNB 403. In step S454, eNB 403 either grants or rejects the request from UE1 401 by sending Msg4 to UE1 401. In step S455, assuming that eNB 403 agrees to the D2D connection between UE1 401 and UE2 402, D2D mode of communication between UE1 401 and UE2 402 would commence.

Figure 4C:
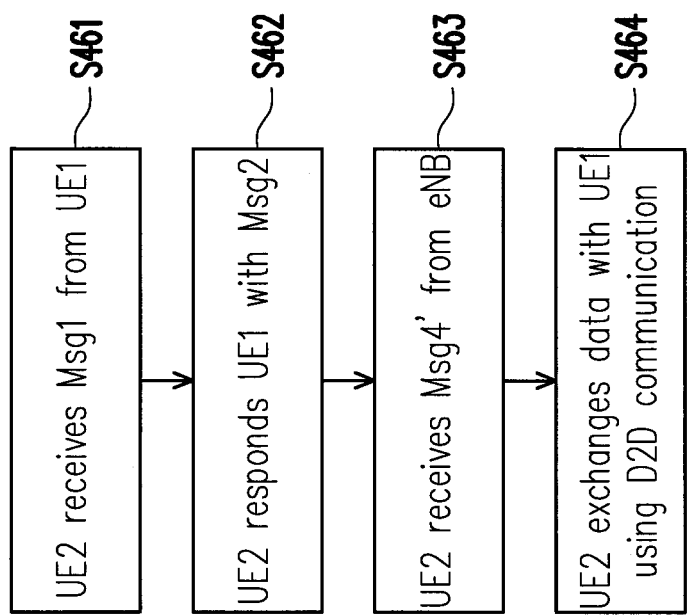
FIG. 4C illustrates a flow chart of mechanism C from a callee's point of view.

FIG. 4C illustrates a flow chart of mechanism C from a callee's point of view. In step S461, UE2 402 which is assumed to have D2D capability receives Msg1 from UE 1 401, and Msg1 includes a connection request for D2D mode of communication. In step S462, UE2 402 which is assumed to agree to establish D2D connection with UE1 401 replies to UE1 401 with Msg2. Afterwards, eNB 403 either grants or rejects the D2D request from UE1 401 by sending Msg4' to UE2 402, and thus, UE2 402 in step S463 receives Msg4' from eNB. In step S464, if eNB agrees to the D2D mode of communication between UE1 401 and UE2 402, then data exchanges will be initiated between UE1 401 and UE2 402.

Figure 5A:
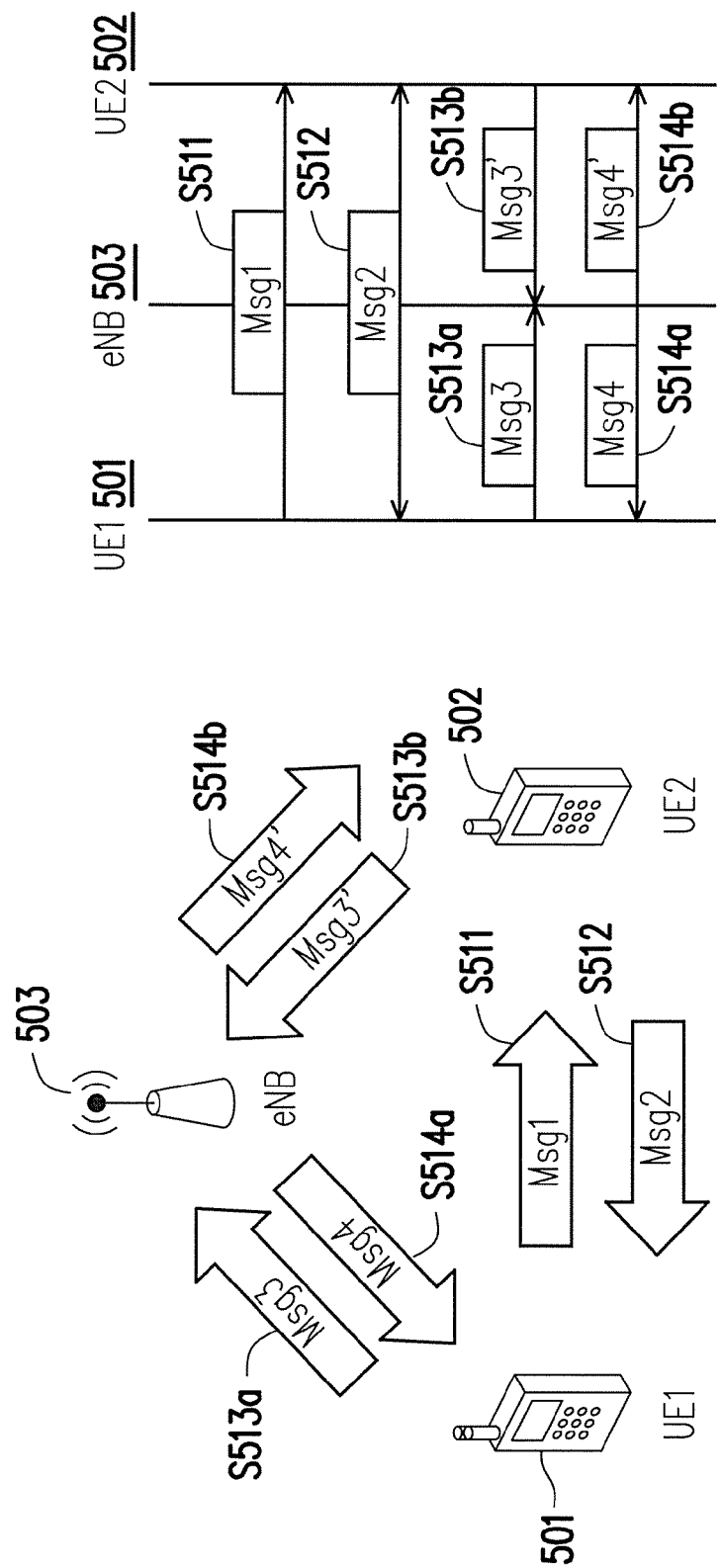
FIG. 5A illustrates D2D mechanism D in accordance with one of the exemplary embodiments of the present disclosure.

FIG. 5A illustrates D2D mechanism D in accordance with one of the exemplary embodiments of the present disclosure. According to FIG. 5A, in step S511, UE1 501 intends to establish a D2D communication by sending Msg1 to UE2 502. In step S512, UE2 502 replies to the D2D request from UE1 501 by sending Msg2 to UE1 501. In step S513a, UE1 501 sends Msg3 to request from the eNB 503 D2D radio resources, and also in step S513b, UE2 502 sends Msg3 to request from the eNB 503 D2D radio resources so that both UE1 501 and UE2 502 sends Msg3 to the eNB 503. The eNB 503 then replies to both UE1 501 and UE2 50 by sending Msg4 to UE1 501 in step S514a and by sending Msg4' to UE2 502 in step S514b. Mechanism D is considered the most complete embodiment as signal exchanges between an eNB and UEs would include both a caller UE and a callee UE.

It should be noted that the information contained in Msg3 and Msg3' may be the same or different. Msg3 may include additional information such as user device identification, authorization information (e.g. authorization code, policy), and D2D connection configuration or policy. Msg3' may also include similar additional information such as user device identification, authorization information (e.g. authorization code, policy), and D2D connection configuration or policy.

Transmission time of Msg3 and Msg3' may be there same, or either one of Msg3 or Msg3' may be sent earlier or later than the other. The time of transmitting the Msg3 from the caller UE and the callee UE may be synchronous or asynchronous.

The information contained in Msg4 and Msg4' may be the same. Msg4 may include additional information such as user device identification, authorization information (e.g. authorization code, policy), and D2D connection configuration or policy. Msg4' may also include similar additional information such as user device identification, authorization information (e.g. authorization code, policy), and D2D connection configuration or policy. Msg4 may further include information such as type of D2D service grant, expiration time, resource allocation (e.g. time/frequency/code) for the D2D data transmission between UE1 and UE2, QoS configuration for D2D data transmission session, security credential for D2D data transmission session, authorization code for D2D data transmission, configuration of D2D data transmission (e.g. which UE is the master or which UE is the slave or there is no master/slave relationship in the D2D pair), and method of starting the actual D2D data session (e.g. paging configuration).

Transmission time of Msg4 and Msg4' may be there same, or either one of Msg4 or Msg4' may be sent earlier or later than the other. The transmissions of Msg4 and Msg4' may be through different channels, or the transmissions may be through the same multicast or broadcast channel.

Figure 5B:
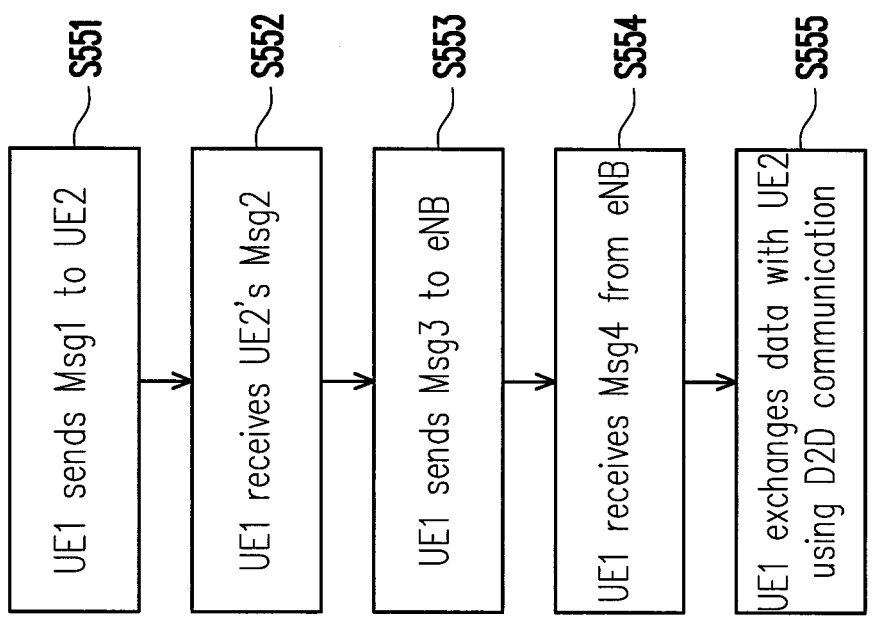
FIG. 5B illustrates a flow chart of mechanism D from a caller's point of view.

FIG. 5B illustrates a flow chart of mechanism D from a caller's point of view. In step S551, UE1 501 sends Msg1 to UE2 502 to establish D2D communication with UE 502, and UE2 502 receives Msg1. UE2 502 may agree to establish D2D communication with UE1 501 by replying to UE1 501 with Msg2 so that in step S552, UE1 501 receives Msg2 from UE2 502. In step S553, UE1 501 sends Msg3 to eNB 503 to request from the eNB 503 D2D radio resources. eNB 503 may then either grant or reject the request from UE1 by sending Msg4 to UE1. In step S554, UE1 501 receives Msg4 from eNB 503. In step S555, assuming that eNB 503 agrees to the D2D communication between UE1 501 and UE2 502, UE1 501 would start exchanging data with UE2 502 using D2D communication.

Figure 5C:
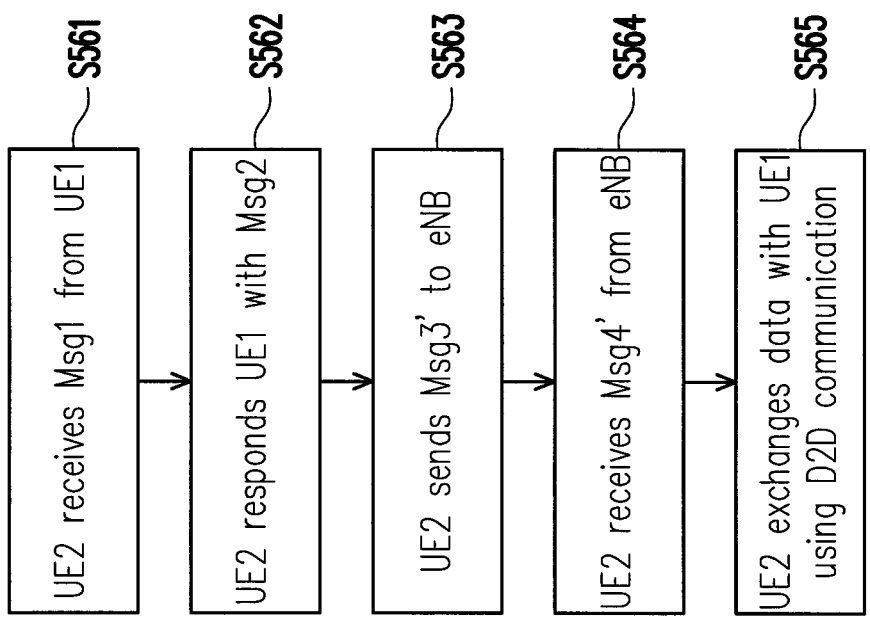
FIG. 5C illustrates a flow chart of mechanism D from a callee's point of view.

FIG. 5C illustrates a flow chart of mechanism D from a callee's point of view. In step S561, UE2 502 receives a D2D communication request from UE1 501 by receiving Msg1 from UE1 501. In step S562, UE2 502 could agree or disagree by responding to the request of UE1 501 with Msg2. In step S563, UE2 502 also request for D2D radio resources from eNB 503 by sending Msg3' to eNB 503. In step S564, UE2 502 receives Msg4' from eNB 503 as eNB 503 either accepts or rejects the request for the D2D communication between UE1 501 and UE2 502. In 5565, UE2 502 exchanges data with UE1 501 by using D2D communication with the permission of eNB 503.

The selection of Mechanisms A-D could be performed by the control node or other structures within a core network in order to adapt to different situations. Mechanism D could be considered the most robust as Msg3 and Msg4 are exchanged between a control node and both the caller and the callee UE so that the signaling exchanges could be received by one of the UEs. Mechanism D could be helpful in urgent situations in which both UEs might be interested in receiving transmissions with the eNB. For mechanism B, only the caller UE would exchange signals with a control node but not the callee UE. Mechanism B is helpful during the situation in which the callee UE could not be reached by the control node but can be reached by a caller UE. In that case, the caller would serve as the only conduit of signaling exchanges with a control node. For mechanism C, Msg3 is only sent by the caller UE in order to reduce network consumption. For mechanism A, the network consumption is further reduced by sending Msg4 to only the callee UE.

Besides the aforementioned Mechanisms A-D, some additional measures could also be implemented. Considering the radio resources, these signaling messages (e.g. Msg1, Msg2, Msg3, Msg4, etc.) could be on either dedicated or shared resources. For one embodiment, a specific time slot for RACH transmission as in Msg1 could be allocated for general purpose D2D discovery as a non-D2D related discovery may not share this time slot. For one embodiment, a specific set of RACH codes could be allocated for general purpose D2D discovery as conventional RACH procedure could use other RACH codes. For one embodiment, RACH codes and RACH transmission opportunities could be shared. For one embodiment, transmission resources of Msg3 and Msg4 could be dedicatedly allocated for the caller UE and the callee UE. For one embodiment, resources may be dedicatedly allocated to a specific UE for D2D discovery. For example, a dedicated RACH code could be assigned only to the caller UE for the caller UE to discover other D2D callees.

In addition to the typical information included in a non-D2D Msg3 message, the D2D relevant information in Msg3 (or Msg3') may also include the identification or address of D2D callers, the identification or address of D2D callees, a type of D2D service request, reception qualities of Msg1 and/or Msg2 (which could be retrieved by measuring the received signal), expiration time, and the RNTI of the UE2 or UE1 or both.

In addition to the typical information included in a non-D2D Msg4 message, the D2D relevant information in Msg4 (or Msg4') may also include the identification or address of D2D callers, the identification or address of D2D callees, a type of D2D service grant, expiration time, resource allocation (e.g. time/frequency/code) for the D2D data transmission between a caller and callee, QoS configuration for D2D data transmission session, security credential for D2D data transmission session, authorization code for D2D data transmission, configuration of D2D data transmissions (e.g. which UE is the master or which UE is the slave or there is no master/slave relationship in the D2D pair), the method of starting the actual D2D data session (e.g. paging configuration).

In addition, the caller or callee devices may have already been attached to an eNB in the RRC_connected state before performing this proposed D2D discovery procedure. For one embodiment, the devices may have registered with an eNB as there could be active connections between an eNB and UEs. The signaling messages between eNB and UE could be transmitted via these existing channels. The signaling messages (e.g. Msg3, Msg4, Msg3', Msg4') might use pre-existing control channels between the caller UE and eNB (or between the callee UE and an eNB). The pre-existing control channel may be typical LTE or 3G or cellular RAN control channels in non-D2D system.

For the D2D communication between a caller UE and a callee UE, the D2D data session may start immediately after the reception of Msg4 as Msg4 and Msg 4' may serve as triggers to begin the D2D data transmission, or there could be another explicit data session initialization for data session. The channel or time or other radio resource to conduct D2D data transmission could be configured within Msg4 or Msg4' or another signaling message afterwards.

Furthermore, it should be mentioned that The D2D communications may be rejected by either a D2D callee or an eNB. In these cases the rejection messages should be explicitly signaled by messages, or a timer should be set to use a time-out event trigger the rejections. If a callee rejects a D2D communication request from a caller, then a callee should respond with a rejection message carried within Msg2. If an eNB rejects a D2D connection establishment request from a UE, then rejection operations should be implemented depending on which of the mechanism has been adopted:

For mechanism A, an eNB would convey a rejection message in Msg4, and the callee would be informed of the rejection when Msg4 is received. The callee should subsequently inform the caller of the rejection after the callee receives Msg4. For Mechanism B: An eNB would convey the rejection message in Msg4, and thus when the caller receives the Msg4, the caller is informed of the rejection. The caller then should inform the callee of the rejection after the caller receives Msg4. The callee should also setup a timer after sending Msg2 if the callee rejects the D2D communication. If the callee sets a timer after sending Msg2, and the timer ran out before receiving a permission to commence the D2D data transmission, then the callee would consider the D2D communication has been rejected by the eNB. As for mechanisms C and D, since both the caller and the callee receive Msg4 from the eNB, both the caller and the callee would be aware of the rejection.

Figure 6:
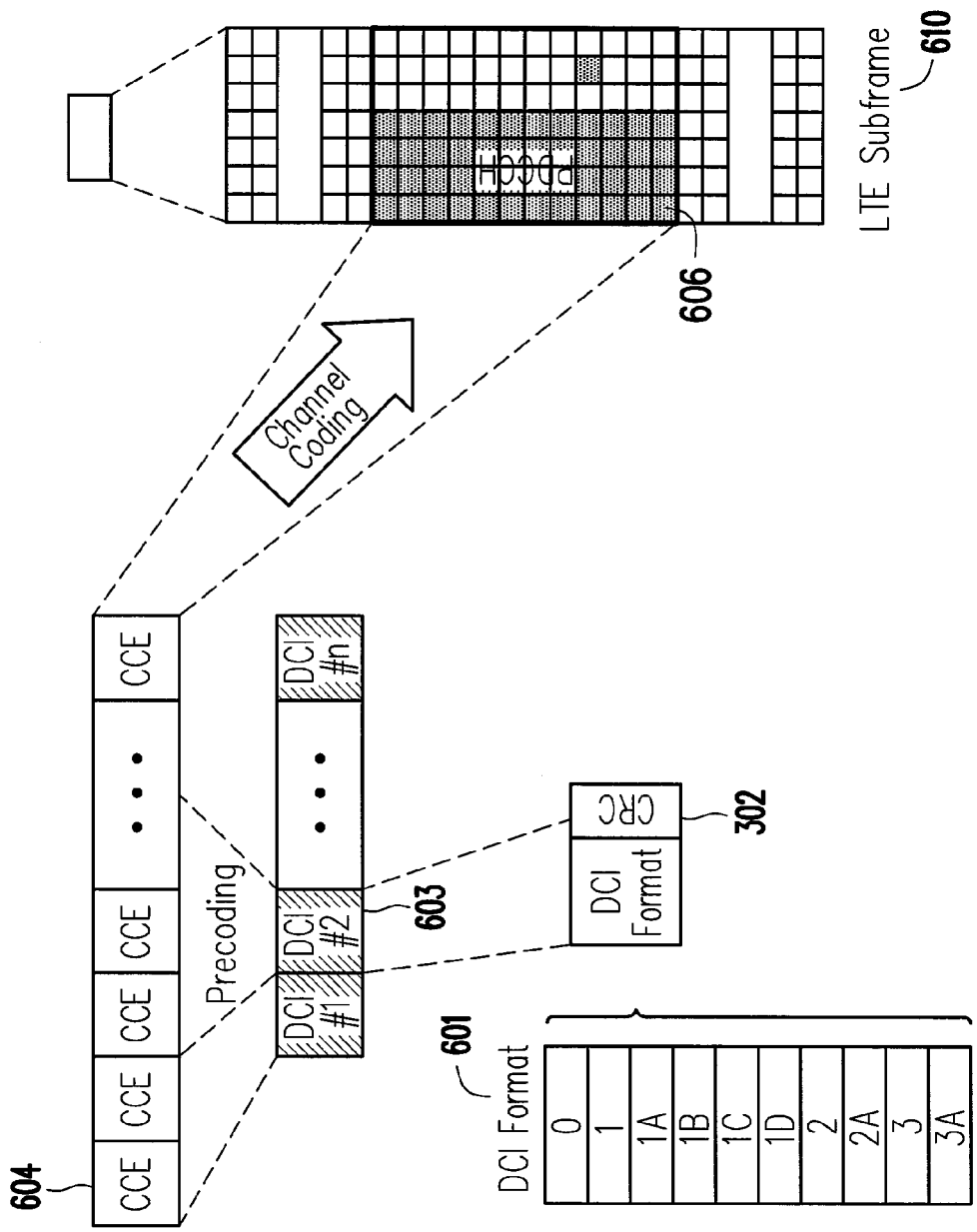
FIG. 6 illustrates PDCCH allocation and transmission in a LTE communication system.

For resource allocations and synchronization, additional embodiments would be proposed to provide more specific details of the network entry procedure. First, how a traditional LTE system would indicate the radio resources for wireless channels is discussed, and then specific embodiments based on the revised traditional LTE would be proposed. FIG. 6 illustrates PDCCH allocation and transmission in a LTE communication system. FIG. 6 shows a LTE subframe 610 which includes a region for the Physical Downlink Control Channel (PDCCH). The PDCCH 606 carries Control Channel Elements (CCE) 604, and multiple downlink channel indicator DCI messages could be integrated into a CCE 604. Resource allocations in a LTE system is indicated by the DCI which contains multiple DCI formats 601. A DCI message is composed of the DCI format 601 appended with a CRC. A DCI message 603 would contain a CRC 302 appended to a DCI format. A CRC within a DCI message is scrambled with an assigned radio network temporary identifier (RNTI). If a UE does not have the exact RNTI value, the UE cannot decode the CRC message and therefore cannot receive and decode the DCI message.

Figure 7A:
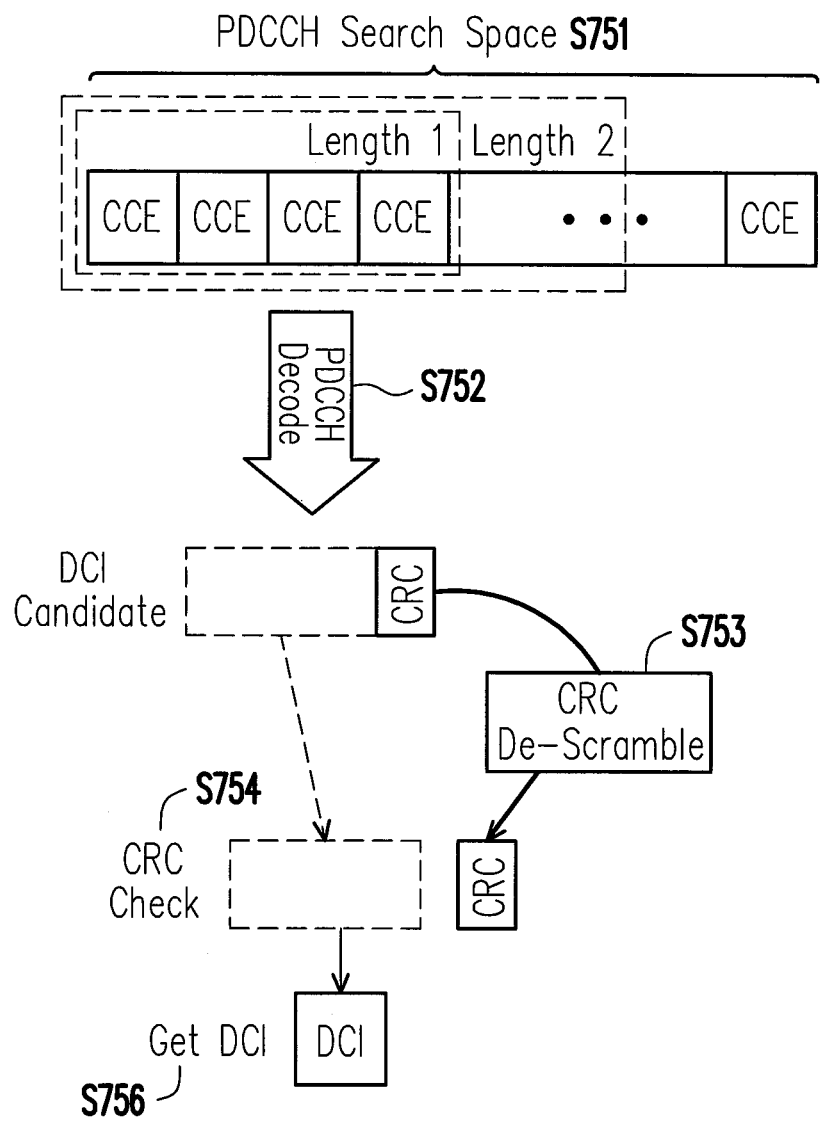
FIGS. 7A & 7B illustrates DCI decode in a LTE communication system.
Figure 7B:
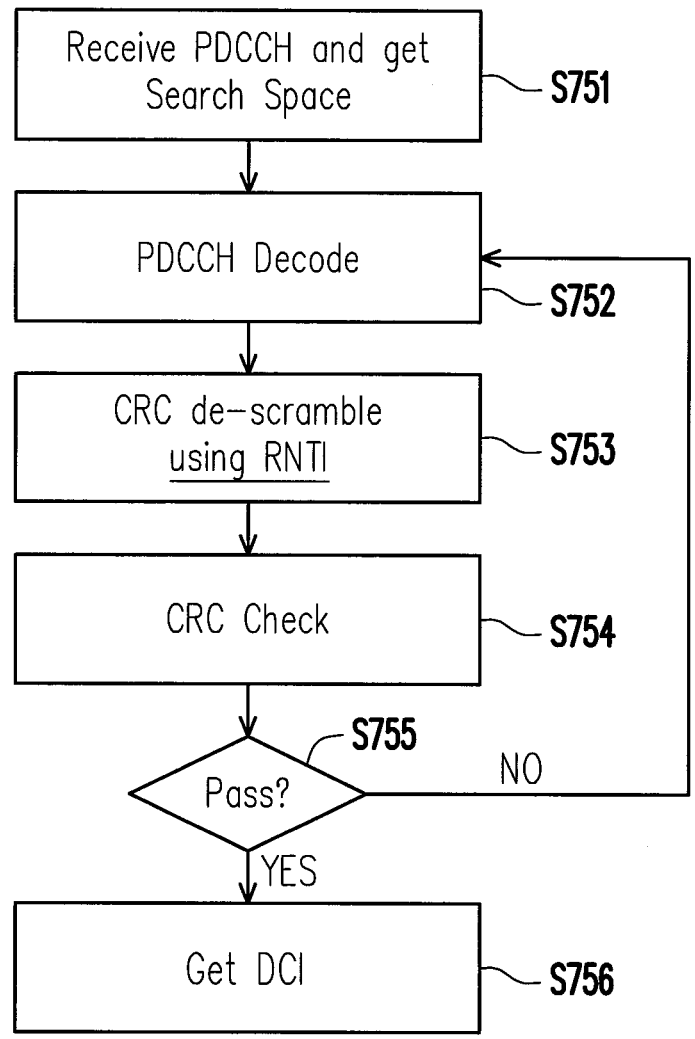

FIG. 7A and FIG. 7B illustrate DCI decode in a LTE communication system. Referring to FIG. 7A and FIG. 7B together, in step S751, a UE receives a subframe including a PDCCH and defines a search space. In step S752, the UE performs the blind PDCCH decode. In step S753, CRC is de-scrambled using RNTI. In step S754, CRC check is performed. In step S755, if the CRC check passes, the DCI is correctly decoded and obtained by the UE. If the CRC check does not pass, then the procedure loops back to step S752 to continue the blind PDCCH decode.

Based on the aforementioned DCI decode mechanism, an embodiment for radio resource allocation and synchronization would be proposed. Here we assume that the UEs are not in the RRC_Connected state and thus are not synchronized with the other D2D UEs and an eNB. It is proposed that the synchronization of between two D2D UEs and between a D2D UE and an eNB should be done in the process of D2D RACH, which also indicates radio resource allocation. In practice, D2D communication requires accurate synchronization and concrete radio resource allocation. If a D2D caller and callee are synchronized with an eNB separately, we may assume that the caller, the callee, and the eNB could be well synchronized and thus no extra synchronization effort is required.

However, D2D callers and callee could very well be idle UEs, and idle UEs may not be synchronized with an eNB or with each other and thus idle UEs and eNB would not be in RRC_Connected state among each other. In this case, if a caller UE and a callee UE are not synchronized, and exchanges of Msg1 and Msg2 between the caller and the callee might not be successful. Besides, the transmission of Msg3 and Msg4 requires RRC connections in LTE systems, and RRC messages should be allocated by explicit resource allocation indicator. For example, Msg3, Msg4, and resources for D2D transmission could be indicated by the DCI. This challenge could be overcome by the signaling process of the Msg1 and Msg2 exchange, and therefore further embodiments related to specific implementations of Msg1 and Msg2 could be proposed to support synchronization and radio resource allocation.

Figure 8A:
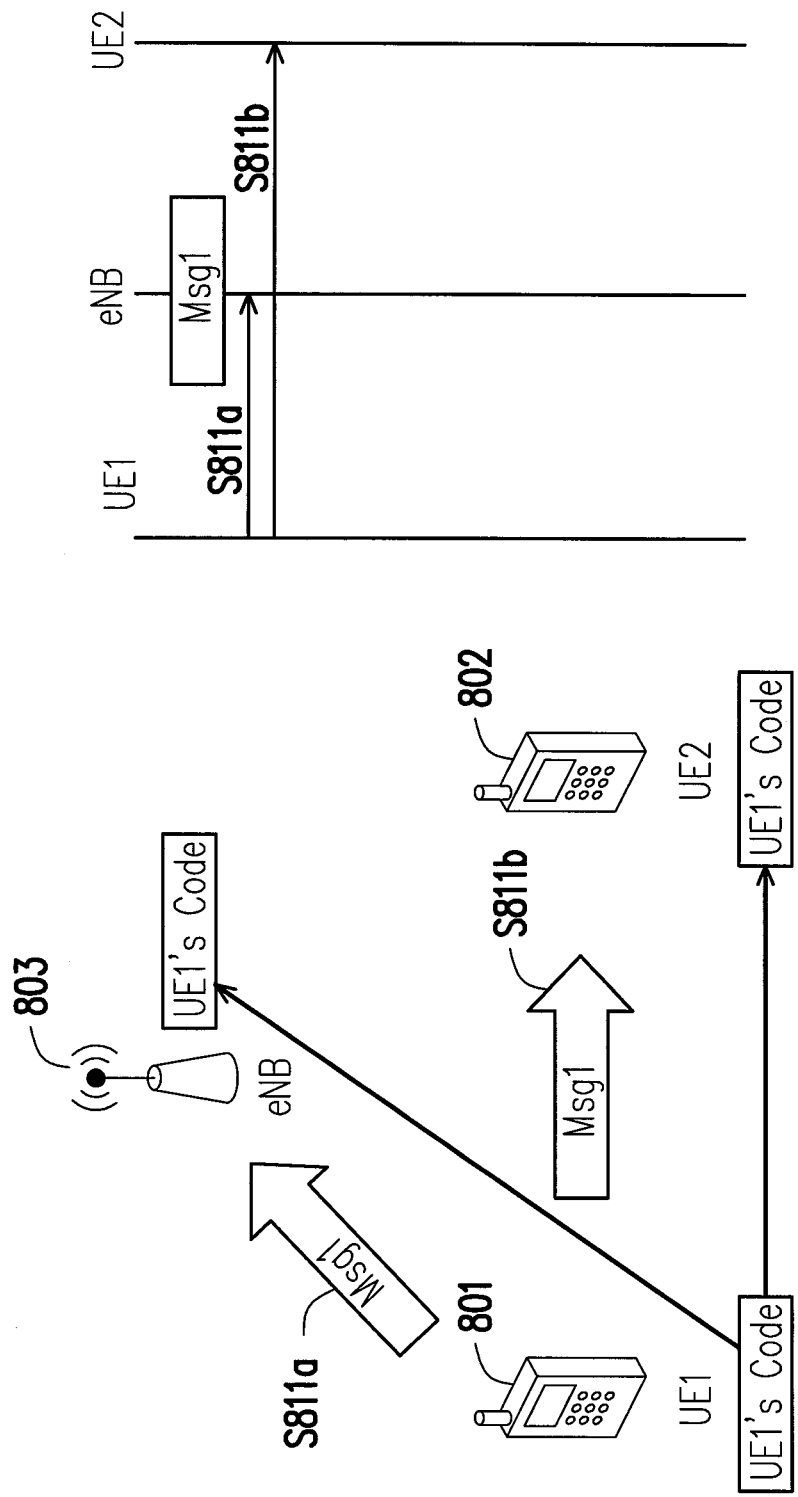
FIG. 8A illustrates Msg1 with synchronization and resource allocation in accordance with one of the exemplary embodiments of the present disclosure.

FIG. 8A illustrates Msg1 for synchronization and resource allocation in accordance with one of the exemplary embodiments of the present disclosure. FIG. 8A shows UE 801 transmits Msg1 to UE 802 in step S811b but also transmits Msg1 to eNB 803 in step S811a. The contents of Msg1 would include a code or a preamble of UE1 801, and therefore both UE2 802 and eNB 803 would be notified of the code of the UE1 801 and thus would enable further transmissions of DCI. After receiving Msg1, the eNB 803 assign a RNTI to UE1 801 based on the code or the preamble of UE1 801.

Figure 8B:
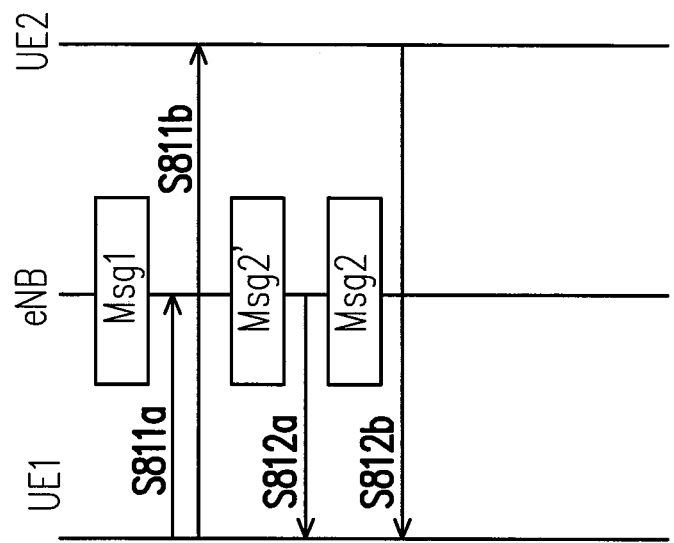
FIG. 8B illustrates Msg2 with synchronization and resource allocation in accordance with one of the exemplary embodiments of the present disclosure.
Figure 8B:
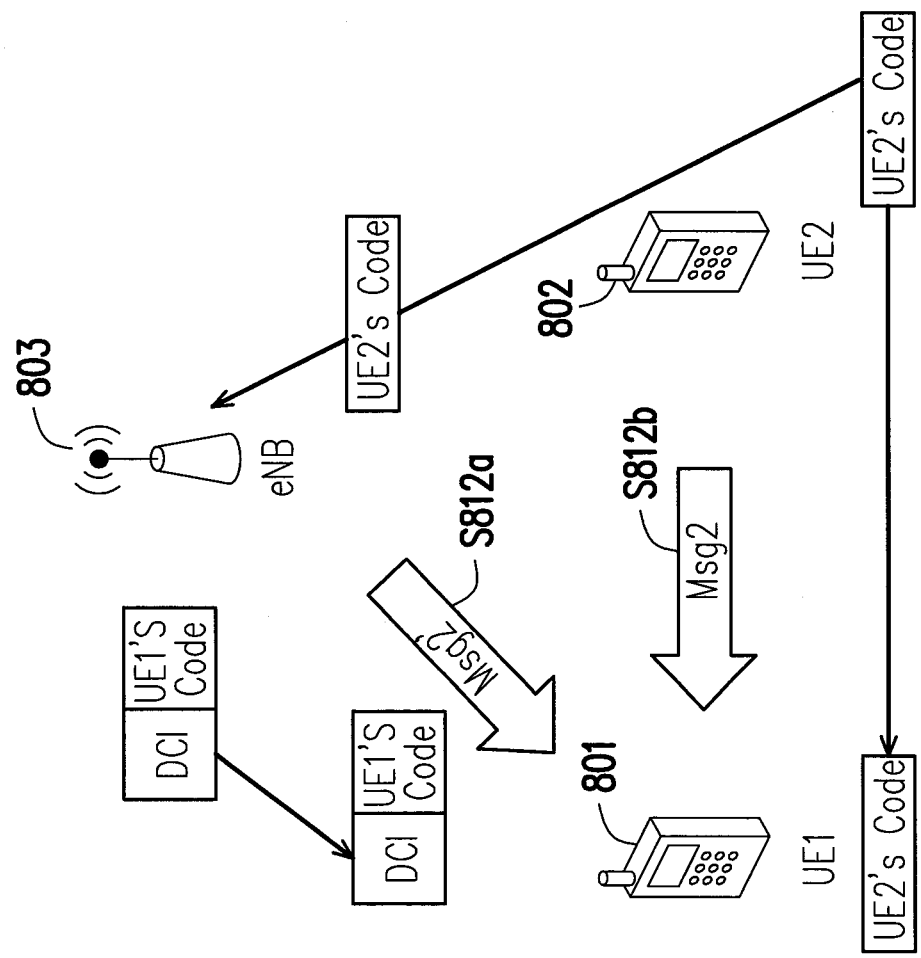

Next, FIG. 8B illustrates Msg2 for synchronization and resource allocation in accordance with one of the exemplary embodiments of the present disclosure. In addition to FIG. 8A, FIG. 8B shows the transmission of Msg2 from UE2 802 to UE1 801 in step S812b and also Msg2' from eNB 803 to UE1 801 in step S812a. The UE2 802 would send its preamble code to UE1 801 in Msg2, and UE1 801 would know the preamble code of UE2 802. Therefore, if UE1 801 is not in the synchronized state with UE2 802 and eNB 803, Msg1 would be sent to both UE2 802 and eNB 803, and Msg2 would be received from UE2 802 and Msg2' would be received from eNB 803. Msg2 from UE2 802 to UE1 801 in step S812b would inform UE1 801 of the code (preamble) of UE2 802 as UE1 801 receives the messages encoded by the code of UE2 802. By exchanging Msg1 and Msg2, UE1 801 and UE2 802 would be synchronized.

Furthermore, eNB 803 would send Msg2' to UE1 801 in step S812a to inform UE1 801 of the radio resources for Msg3 and Msg4. The radio resource is indicated in the DCI which can be decoded from the PDCCH of Msg2'. The DCI is scrambled with the RNTI which would be generated by the code of UE1 801. There is a one to one mapping between the DCI code and the assigned RNTI, so that the RNTI could be calculated from the DCI code, and the DCI code could be calculated from the RNTI. When UE 801 receive from the eNB the assigned RNTI in the Msg2', the RNTI would enable the DCI to be correctly decoded and therefore the resource allocations of Msg3 and Msg4 would be obtained by UE1 801. Also when UE 801 receive Msg2, the UE 801 could obtain the code from UE2 802 without having to wait for Msg2. Therefore by exchanging Msg1 and Msg2', UE1 801 and eNB 803 would be synchronized. Also Therefore, by sending the Msg2 and Msg2', UE1 801 is synchronized with both UE2 802 and eNB 803, and thus the challenge of synchronization would be solved.

Figure 8C:
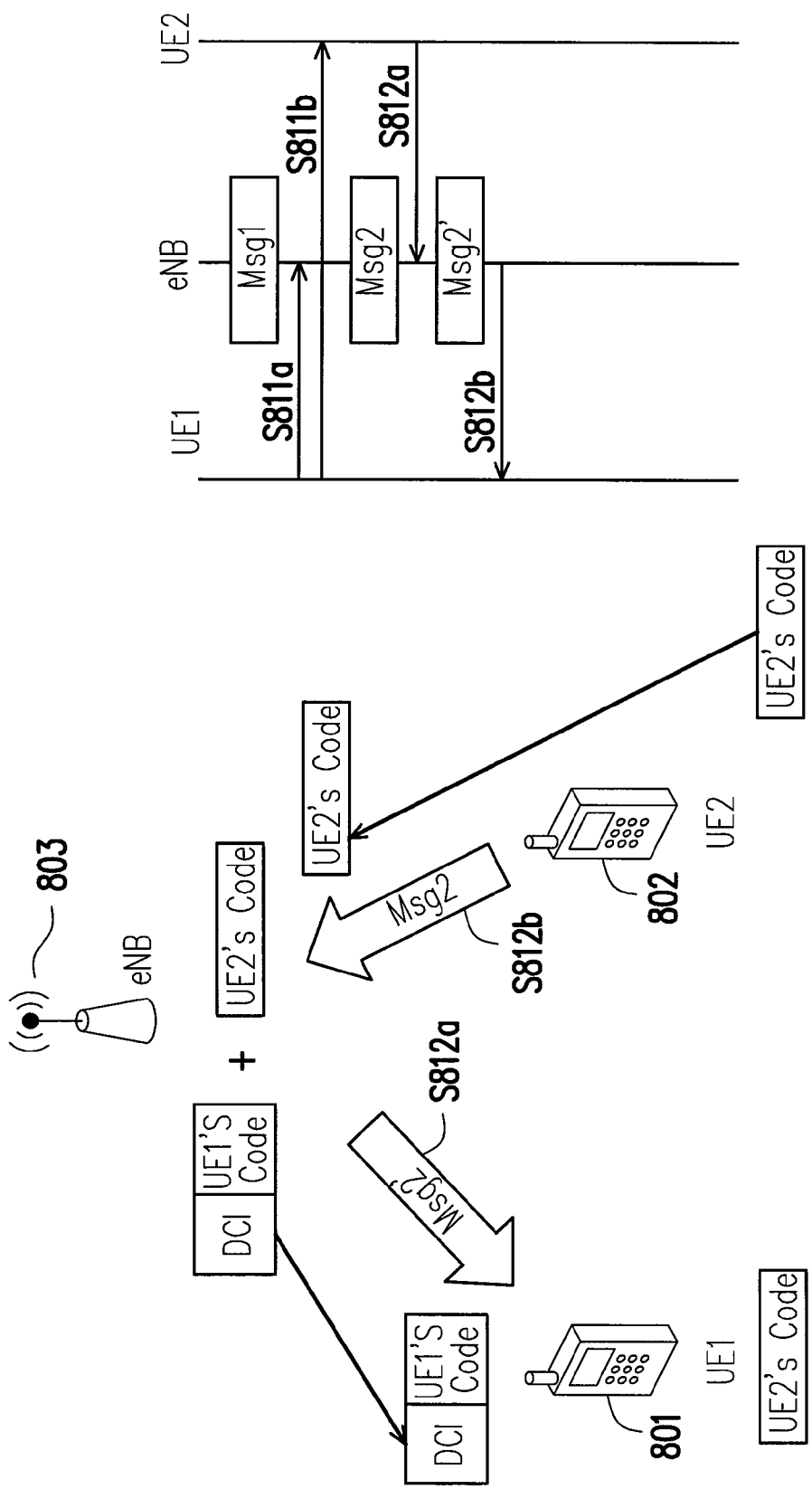
FIG. 8C illustrates another embodiment of Msg2 with synchronization and resource allocation in accordance with one of the exemplary embodiments of the present disclosure.

FIG. 8C illustrates another variation of FIG. 8B. It is possible for UE2 802 to reduce some signaling messages by applying the scenario in FIG. 8C. FIG. 8C is similar to FIG. 8B except that in step S812a UE2 802 would transmit Msg2 with UE2 802's code to eNB 803. In response to receiving UE2 802's code, in step S812b the eNB 803 would transmit Msg2' to UE1 801. The Msg2' would include the resources for Msg3 and for Msg4. Besides, the code of UE2 802 would be included in Msg2'. Since UE1 801 is aware of UE2 802's code and the code's corresponding RNTI by receiving the Msg2', this would thus enables the decoding of DCI in Msg4, which has been encoded using UE2 802's RNTI.

Figure 8D:
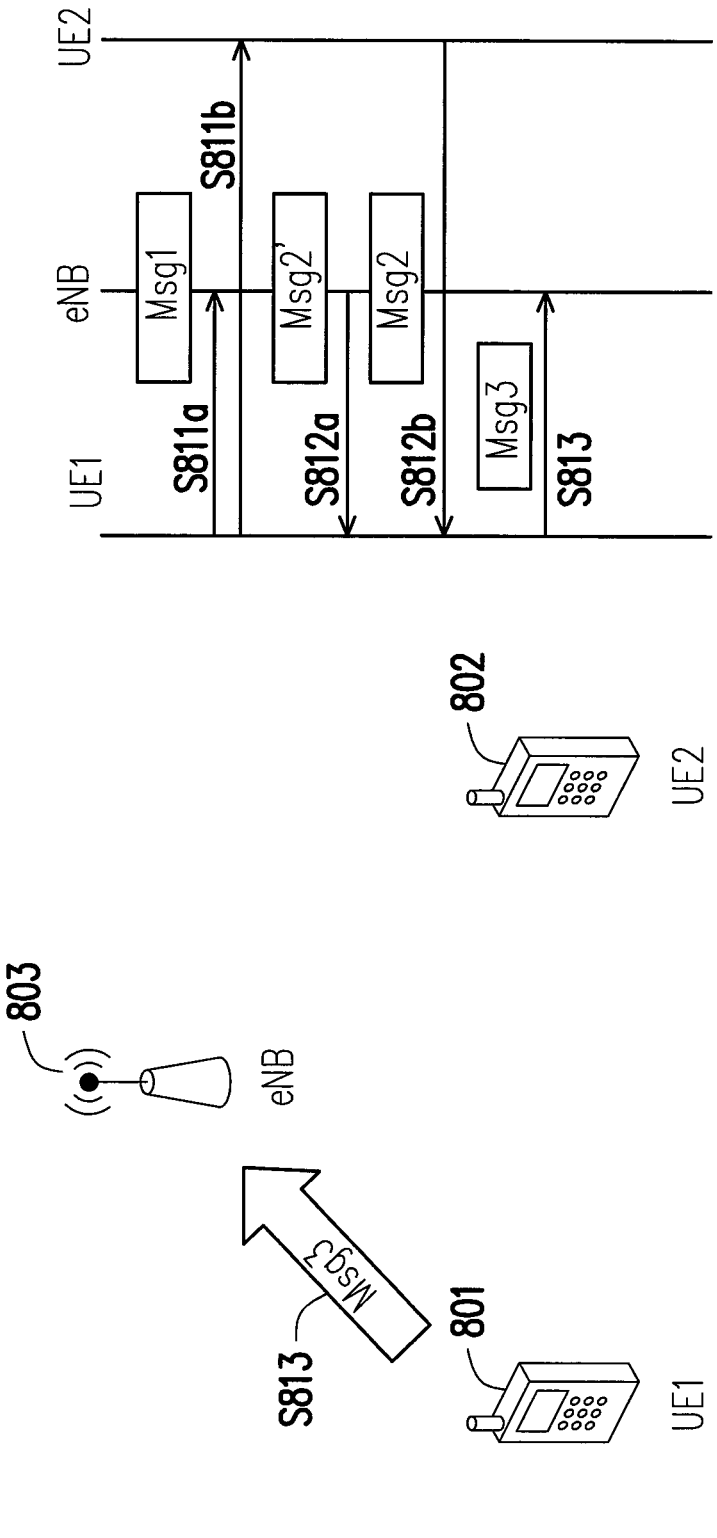
FIG. 8D illustrates Msg3 with synchronization and resource allocation in accordance with one of the exemplary embodiments of the present disclosure.

In addition to Figure~FIG. 8C, FIG. 8D illustrates the continuation of the synchronization and resource allocation procedure with Msg3 in accordance with one of the exemplary embodiments of the present disclosure as follows. FIG. 8C illustrates in step S813 UE1 801 sending the Msg3 to eNB 803 using the resource allocation specified in Msg2'. Transmission of Msg3 from UE1 801 to eNB 803 would requests for the D2D connection between UE1 801 and UE2 802.

Figure 8E:
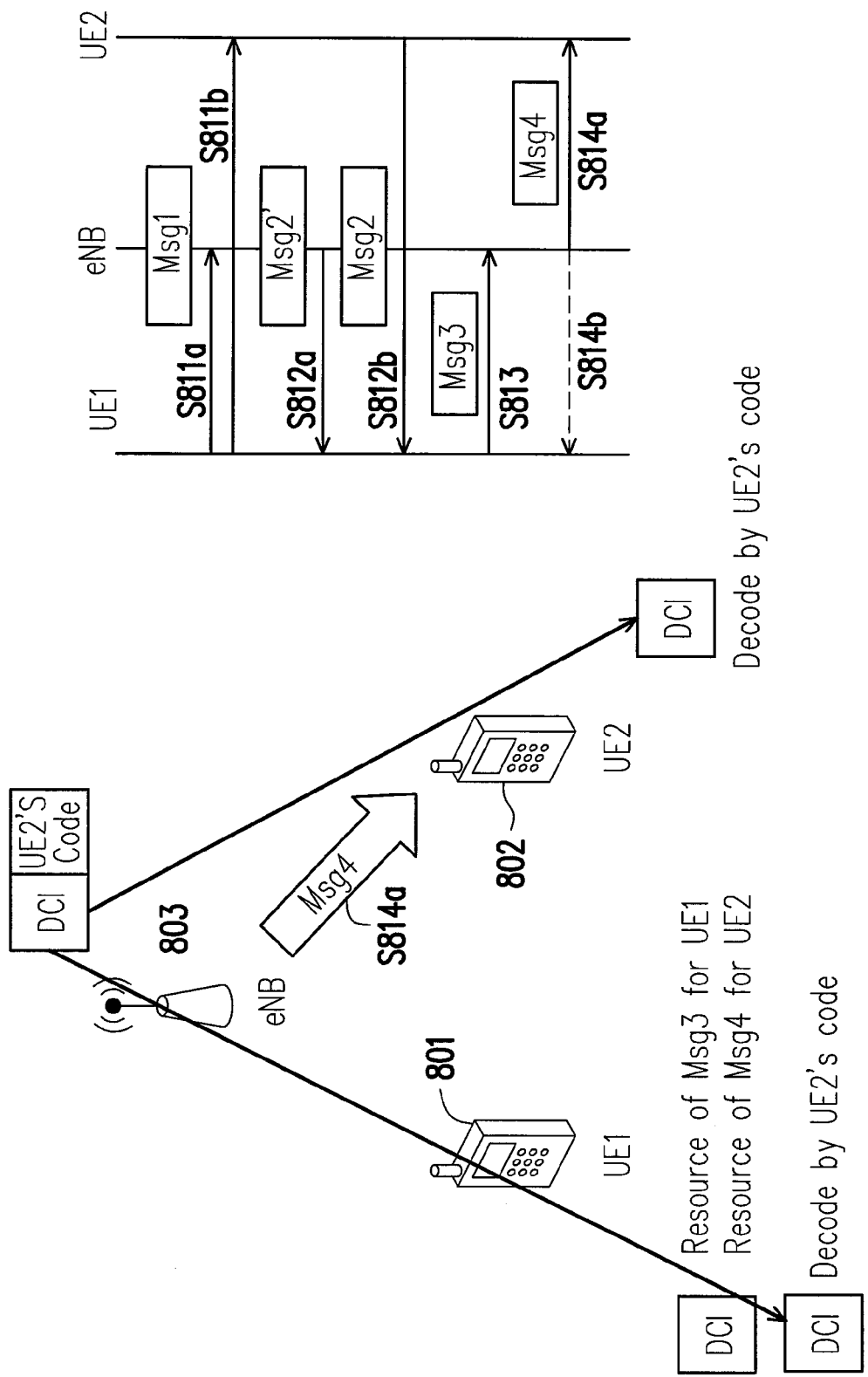
FIG. 8E illustrates Msg4 with synchronization and resource allocation in accordance with one of the exemplary embodiments of the present disclosure.

FIG. 8E illustrates the continuation of FIG. 8D showing Msg4 with synchronization and resource allocation in accordance with one of the exemplary embodiments of the present disclosure. In step S814a, eNB 803 sends Msg4 which would include the radio resource allocation for D2D transmission and is encoded with UE2's code. Because Msg4 would also be overheard by UE1 801 which has already received UE2's code in step S812b, UE1 801 can then decode the contents of the DCI in Msg4, knowing the resource for the D2D transmission. Therefore, by exchanging Msg2 and Msg4, synchronization would be achieved among UE1 801, UE2 802, and eNB 803 since it was previously mentioned that by exchanging Msg1 and Msg2, UE1 801 and UE2 802 would be synchronized, by exchanging Msg1 and Msg2', UE1 801 and eNB 803 would be synchronized, and then by receiving Msg4, UE1 801, UE2 802, and eNB 803 would all by synchronized among one another.

Figure 9A:
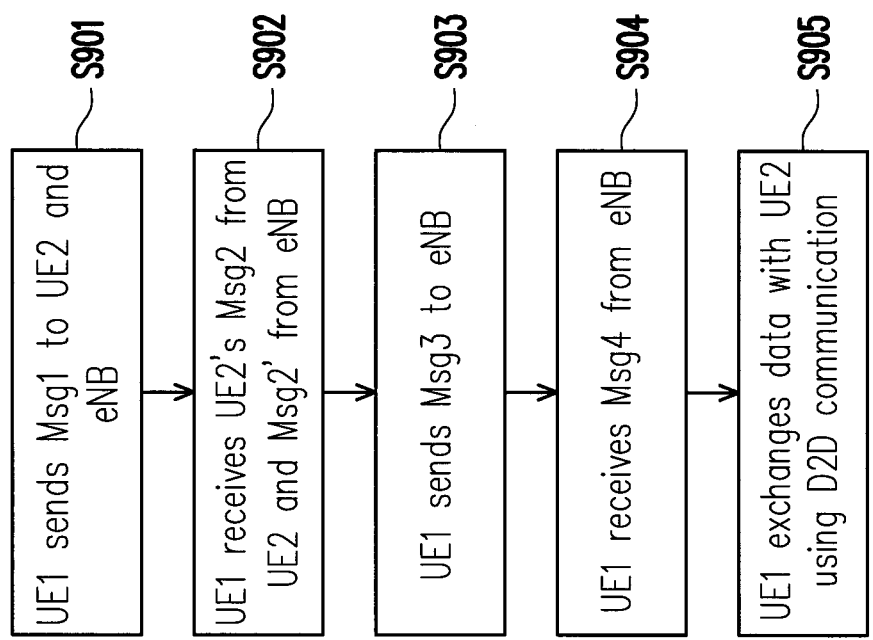
FIG. 9A illustrates caller's view of message exchange with resource allocation and indication.

FIG. 9A is flow chart which summarizes the aforementioned description of resource allocation and synchronization through message exchanges based on the point of view of a caller or UE1. In step S901, UE1 (a caller) intends to establish D2D communication with UE2 (a callee) by sending Msg1 to UE2 and to eNB. In step S902, UE1 receives Msg2 from UE2 and Msg2' from eNB as UE2 agrees to establish D2D communication with UE1 so that UE2 replies with Msg2. Also eNB would reply to UE1 with Msg2' which includes the DCI for Msg3 and Msg4. In step S903, UE1 sends Msg3 to eNB as UE1 requests from eNB D2D radio resources so that UE1 sends Msg3 to eNB using resources indicated by the DCI which has been obtained previously from Msg2'. In step S904, UE1 receives Msg4 from eNB as eNB either accepts or rejects the request from UE1 for D2D communication by sending Msg4 to UE2. UE1 may also receive Msg4 based on the DCI of Msg4 obtained previously. In step S905, UE1 exchanges data with UE2 using D2D communication with the permission of eNB.

The eNB may send messages to a mobile switching center (MSC) or exchange messages with the MSC to inform of the D2D communication between a caller UE and a callee UE.

FIG. 9B is flow chart which summarizes the aforementioned description of resource allocation and synchronization through message exchanges based on the point of view of a callee or UE2. In step S951, UE2 (a callee) receives from UE1 (a caller) Msg1 which includes a connection request from UE1 for D2D communication. In step S952, after UE2 agrees to establish D2D communication with UE1, UE2 replies to both UE1 and eNB by sending Msg2 to both UE1 and eNB. In step S953, UE2 receives Msg4 from eNB as the eNB either grants or rejects the request from UE1 by sending Msg4 to UE2. Msg4 here is encoded with UE2's RNTI code. In step S954, UE1 exchanges data with the UE2 using D2D communication if eNB agrees the D2D connection between UE1 and UE2, and then data session would be initialized.

In view of the aforementioned descriptions, the present disclosure is able to facilitate D2D communication between two UEs by modifying a conventional network entry procedure so that D2D communication would made be possible without introducing drastic changes to an existing infrastructure. By reducing the need for an eNB to deliver data in between two UEs, network consumptions could be reduced. Also by allowing two UEs to directly detect and receiving replies from other UEs in the proximity, channel state information among UEs could be known so that the reliability of D2D communication could be enhanced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A device to device (D2D) communication method, adapted for a caller user equipment (UE), and the method comprising:
   transmitting to a first device a Msg1 comprising a request for a direct communication with the first device, wherein the Msg1 is a random access preamble;
   receiving from the first device a Msg2 comprising a first decision to either accept or reject the request for the direct communication with the first device, wherein the Msg2 is a random access response;
   transmitting to a second device a Msg3 comprising the request for the direct communication with the first device when the first decision is to accept, wherein the Msg3 is a radio resource control (RRC) Connection Request;
   receiving from the second device a Msg4 comprising a second decision to either accept or reject the direction communication between the caller UE and the first device; and
   establishing the direct communication with the first device when the request is accepted by the second device,
   wherein the step of receiving from the first device the Msg2 comprising the first decision to either accept or reject the request for the direct communication with the first device further comprises:
      receiving from the second device another Msg2 which includes resource allocation for the Msg3 and the Msg4,
      wherein the caller UE and the first device synchronize with each other when the caller UE transmits the Msg1 to the first device and then the caller UE receives the Msg2 from the first device, and the caller UE and the second device are synchronized with each other when the caller UE transmits the Msg1 to the first device and then the caller UE receives the another Msg2 from the second device.

2. The method of claim 1 further comprising:
   obtaining a preamble code of the first device from the Msg2; and
   decoding a DCI from the first device based on the preamble code of the first device from the Msg2.

3. The method of claim 1, wherein the Msg1 further comprises a predefined signaling sequence or a predefined code.

4. The method of claim 1, wherein the Msg1 further comprises a dynamically selected signaling sequence or a dynamically selected code from a set of signaling sequences or from a set of codes.

5. The method of claim 1, wherein the Msg1 further comprises indicating a D2D service or a non-D2D service and a caller UE or a callee UE.

6. The method of claim 1, wherein the Msg3 further comprises a request for radio resources from the second device.

7. The method of claim 1, wherein the Msg3 further comprises: a device identification, authorization information, D2D configuration or policy, type of D2D service request, reception quality of the Msg1 and/or the Msg2, expiration time, and an RNTI of the caller UE or the first device or both.

8. The method of claim 1, wherein the Msg4 further comprises: a device identification, authorization information, D2D connection configuration or policy, type of D2D service grant, expiration time, resource allocation, QoS configuration, Security credential, authorization code, configuration for D2D data transmission, and method of starting the actual D2D data session.

9. The method of claim 1, wherein the steps of claim 1 are executed by a user equipment comprising a transceiver for transmitting and receiving wireless data and a processing circuit coupled to the transceiver for executing the steps of claim 1.

10. The method of claim 1, wherein the first device is an electronic device comprising wireless D2D capability.

11. The method of claim 1, wherein the second device is one of an enhanced Node B (eNB), a base station (BS), a Serving Gateway (S-GW), a Gateway General Packet Radio Services (GPRS) Support Node (GGSN), a Serving GPRS Support Node (SGSN), a Radio Network Controller (RNC), or an Access Service Network (ASN-GW).

12. A device to device (D2D) communication method, for use by a callee (UE), and the method comprising:
   receiving from a first device a Msg1 comprising a request for a direct communication with the first device, wherein the Msg1 is a random access preamble;

transmitting to the first device a Msg2 comprising a first decision to either accept or reject the request for the direct communication with the first device, wherein the Msg2 is a random access response, transmitting to a second device a Msg3 comprising the request for the direct communication with the first device when the first decision is to accept the request for the direct communication with the first device; and when the first decision is to accept the direct communication with the first device, establishing the direct communication with the first device when the direction communication is granted by the second device, wherein before the step of establishing the direct communication with the first device when the direction communication is granted by the second device, the method further comprises:

receiving from the second device a Msg4 comprising a second decision to either accept or reject the direction communication between the callee UE and the first device, wherein the callee UE and the first device synchronize with each other when the callee UE receives the Msg1 from the first device and then the first device receives a Msg2 from the callee UE, and the caller UE and the second device are synchronized with each other when the caller UE transmits the Msg2 to the first device and then the caller UE receives the Msg4 from the second device.

13. The method of claim 12, wherein the Msg2 further comprises a preamble code of the callee UE.

14. The method of claim 12, wherein the Msg4 is encoded by the second device based on the preamble code of the callee UE.

15. The method of claim 12, wherein the Msg1 further comprises a predefined signaling sequence or a predefined code.

16. The method of claim 12, wherein the Msg1 further comprises a dynamically selected signaling sequence or a dynamically selected code from a set of signaling sequences or from a set of codes.

17. The method of claim 12, wherein the Msg1 further comprises indicating a D2D service or a non-D2D service and a caller UE or a callee UE.

18. The method of claim 12, wherein the Msg3 further comprises a request for radio resources from the second device.

19. The method of claim 12, wherein the Msg3 further comprises: a device identification, authorization information, D2D configuration or policy, type of D2D service request, reception quality of the Msg1 and/or the Msg2, expiration time, and an RNTI of the caller UE or the first device or both.

20. The method of claim 12, wherein the Msg4 further comprises: a device identification, authorization information, D2D connection configuration or policy, type of D2D service grant, expiration time, resource allocation, QoS configuration, Security credential, authorization code, configuration for D2D data transmission, and method of starting the actual D2D data session.

21. The method of claim 12, wherein the steps of claim 12 are executed by a user equipment comprising a transceiver for transmitting and receiving wireless data and a processing circuit coupled to the transceiver for executing the steps of claim 12.

22. The method of claim 12, wherein the first device is an electronic device comprising wireless D2D capability.

23. The method of claim 12, wherein the second device is one of an enhanced Node B (eNB), a base station (BS), a Serving Gateway (S-GW), a Gateway General Packet Radio Services (GPRS) Support Node (GGSN), a Serving GPRS Support Node (SGSN), a Radio Network Controller (RNC), or an Access Service Network (ASN-GW).

24. A device to device (D2D) communication method, for use by a control node, and the method comprising:

receiving a Msg3 from a first device comprising a request for a direct communication between the first device and a second device after the first device and the second device have communicated directly through a Msg1 and a Msg2 and agreed to the direct communication, wherein the Msg1 is a random access preamble, the Msg2 is a random access response, and the Msg3 is a radio resource control (RRC) Connection Request;

determining whether to grant the request for the direct communication between the first device and the second device; and transmitting to either the first device or the second device a Msg4 comprising a grant or a rejection for the request for the direct communication between the first device and the second device, wherein the Msg4 is a RRC Connection Setup, wherein before the step of receiving the Msg3 from the first device, the method further comprises:

receiving from the first device a Msg1 which encoded based on a preamble code of the first device, wherein the method further comprises:

transmitting to the first device a Msg2' which comprises downlink control information (DCI) to indicate radio resources for the Msg3 and the Msg4, wherein the first device and the control node are synchronized by exchanging the Msg1 and Msg2' between the first device and the control node.

25. The method of claim 24, wherein the control node is one of an enhanced Node B (eNB), a base station (BS), a Serving Gateway (S-GW), a Gateway General Packet Radio Services (GPRS) Support Node (GGSN), a Serving GPRS Support Node (SGSN), a Radio Network Controller (RNC), or an Access Service Network (ASN-GW).

26. The method of claim 24, wherein the first device and the second device are electronic devices comprising wireless D2D capability.

27. The method of claim 24, wherein the Msg3 comprises a request for radio resources from the control node.

28. The method of claim 24, wherein the Msg3 comprises: a device identification, authorization information, D2D configuration or policy, type of D2D service request, reception quality of the Msg1 and/or the Msg2, expiration time, and an RNTI of the caller UE or the first device or both.

29. The method of claim 24, wherein the Msg4 comprises notification to at least one of the first device and the second device whether a network entry has been successful or not.

30. The method of claim 24, wherein the Msg4 further comprises: a device identification, authorization information, D2D connection configuration or policy, type of D2D service grant, expiration time, resource allocation, QoS configuration, Security credential, authorization code, configuration for D2D data transmission, and method of starting the actual D2D data session.

31. The method of claim 24, wherein the step of determining whether to grant the request for the direct communication between the first device and the second device further comprises: determining whether to grant the request based on a network management and configuration policy, pricing, radio resources allocation, and notification of a network or other control nodes.

32. The method of claim 24, wherein the Msg2' comprises a preamble code of the second device.

33. The method of claim 32, wherein the Msg4 is encoded based on the preamble code of the second device.

34. The method of claim 24, wherein the second device and the control node are synchronized by the second device transmitting Msg2 to the first device and by the control node transmitting the Msg4 to the second device.

35. The method of claim 24, wherein the control node comprises a transceiver configured to transmit and receive wireless signals and a processing circuit coupled to the transceiver and is configured to execute the method of claim 24.

* * * * *